United States Patent
Tetsuka

(10) Patent No.: US 11,130,545 B2
(45) Date of Patent: Sep. 28, 2021

(54) BICYCLE CONTROL DEVICE AND BICYCLE SUSPENSION SYSTEM INCLUDING BICYCLE CONTROL DEVICE

(71) Applicant: Shimano Inc., Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 477 days.

(21) Appl. No.: 16/004,960

(22) Filed: Jun. 11, 2018

(65) Prior Publication Data

US 2019/0016409 A1 Jan. 17, 2019

(30) Foreign Application Priority Data

Jul. 11, 2017 (JP) .............................. JP2017-135443

(51) Int. Cl.
| | | |
|---|---|---|
| *B62K 25/04* | (2006.01) | |
| *B62K 25/28* | (2006.01) | |
| *B62M 6/50* | (2010.01) | |
| *B62K 25/08* | (2006.01) | |
| *B62J 45/40* | (2020.01) | |

(52) U.S. Cl.
CPC .............. *B62K 25/04* (2013.01); *B62K 25/08* (2013.01); *B62K 25/286* (2013.01); *B62M 6/50* (2013.01); *B62J 45/40* (2020.02); *B62K 2025/044* (2013.01); *B62K 2025/048* (2013.01)

(58) Field of Classification Search
CPC .............. B62K 25/04; B62K 2025/044; B62K 2025/047; B62K 25/08; B62M 6/50
See application file for complete search history.

(56) References Cited

U.S. PATENT DOCUMENTS

| | | | |
|---|---|---|---|
| 6,162,140 A | 12/2000 | Fukuda | |
| 8,286,982 B2 | 10/2012 | Plantet et al. | |
| 8,843,273 B2 | 9/2014 | Wesling et al. | |
| 9,989,076 B2 * | 6/2018 | Samad | F15B 15/20 |
| 2001/0030408 A1 * | 10/2001 | Miyoshi | B62K 25/04 |
| | | | 280/276 |
| 2004/0138017 A1 | 7/2004 | Kitamura | |
| 2009/0192673 A1 * | 7/2009 | Song | G06F 3/04847 |
| | | | 701/37 |

(Continued)

FOREIGN PATENT DOCUMENTS

| | | |
|---|---|---|
| DE | 60120103 T2 | 1/2007 |
| DE | 10 2006 006 482 A1 | 8/2007 |

(Continued)

*Primary Examiner* — Dale Moyer

(74) *Attorney, Agent, or Firm* — Global IP Counselors, LLP

(57) ABSTRACT

A bicycle control device is provided for a bicycle that includes a front wheel, a drive train and a suspension. The drive train includes an input unit to which driving force is input, a rear wheel to which the driving force is transmitted, and a transmission mechanism that transmits the driving force that is input to input unit to the rear wheel. The bicycle control device includes an electronic controller that changes an operation state of the suspension in accordance with movement of at least one of the input unit, the transmission mechanism, the front wheel and the rear wheel in a state in which the rear wheel is not rotated by the driving force that is input to the input unit.

35 Claims, 12 Drawing Sheets

(56) References Cited

U.S. PATENT DOCUMENTS

| | | | | |
|---|---|---|---|---|
| 2010/0276906 A1* | 11/2010 | Galasso | ............... | F16F 9/464 |
| | | | | 280/283 |
| 2011/0095507 A1* | 4/2011 | Plantet | ............... | B62K 25/286 |
| | | | | 280/277 |
| 2011/0227425 A1* | 9/2011 | Sohn | ............... | H02K 35/02 |
| | | | | 310/17 |
| 2012/0186922 A1* | 7/2012 | Battlogg | ............... | B62K 25/04 |
| | | | | 188/267.1 |
| 2014/0088828 A1* | 3/2014 | Wesling | ............... | B60G 17/019 |
| | | | | 701/37 |
| 2015/0009019 A1 | 1/2015 | Watarai et al. | | |
| 2015/0130153 A1 | 5/2015 | Chen et al. | | |
| 2015/0202919 A1 | 7/2015 | Koshiyama | | |
| 2016/0339990 A1* | 11/2016 | Walthert | ............... | B62K 25/08 |
| 2016/0368559 A1* | 12/2016 | Voss | ............... | B62K 21/12 |
| 2017/0008584 A1 | 1/2017 | Butora et al. | | |
| 2019/0232968 A1* | 8/2019 | Reynolds | ............... | B62K 19/06 |

FOREIGN PATENT DOCUMENTS

| | | |
|---|---|---|
| DE | 10 2007 051 226 A1 | 4/2009 |
| DE | 10 2011 009 405 A1 | 7/2012 |
| EP | 2 248 691 A | 11/2010 |
| JP | 2000-177674 A | 6/2000 |
| JP | 2001-304325 A | 10/2001 |
| JP | 2002-225776 A | 8/2002 |
| JP | 2002-308172 A | 10/2002 |
| JP | 2003-130886 A | 5/2003 |
| JP | 2015-27861 A | 2/2015 |
| JP | 2015-93671 A | 5/2015 |

* cited by examiner

BICYCLE CONTROL DEVICE AND BICYCLE SUSPENSION SYSTEM INCLUDING BICYCLE CONTROL DEVICE

CROSS-REFERENCE TO RELATED APPLICATIONS

This application claims priority to Japanese Patent Application No. 2017-135443, filed on Jul. 11, 2017. The entire disclosure of Japanese Patent Application No. 2017-135443 is hereby incorporated herein by reference.

BACKGROUND

Field of the Invention

The present invention generally relates to a bicycle control device and a bicycle suspension system including the bicycle control device.

Background Information

Bicycles are sometimes equipped with a bicycle control device that controls a bicycle component. Japanese Laid-Open Patent Publication No. 2002-308172 (Patent document 1) discloses an example of a suspension controlled by a bicycle control device.

SUMMARY

One object of the present invention is to provide a bicycle control device and a bicycle suspension system including the bicycle control device that improve usability.

A bicycle control device according to a first aspect of the present invention is for a bicycle including a front wheel, a drive train and a suspension. The drive train includes an input unit to which driving force is input, a rear wheel to which the driving force is transmitted, and a transmission mechanism that transmits the driving force that is input to the input unit to the rear wheel. The bicycle control device includes an electronic controller that changes an operation state of the suspension in accordance with movement of at least one of the input unit, the transmission mechanism, the front wheel and the rear wheel upon determining the rear wheel is in a state in which the rear wheel is not rotated by the driving force that is input to the input unit. In accordance with the first aspect, a control for changing the operation state of the suspension is started before the driving force that is input to the input unit starts driving the rear wheel. Thus, the operation state of the suspension is changed at an early stage. This contributes to usability.

In accordance with a second aspect of the present invention, the bicycle control device according to the first aspect is configured so that the electronic controller changes the operation state of the suspension in accordance with the movement of at least one of the input unit, the transmission mechanism, the front wheel and the rear wheel while the rear wheel is not rotated by the driving force that is input to the input unit upon determining a state in which the driving force is not input to the input to the input unit changes to a state in which the driving force is input to the input unit. In accordance with the second aspect, the operation state of the suspension as the rider starts pedaling the bicycle can be changed at an early stage.

In accordance with a third aspect of the present invention, the bicycle control device according to the first or second aspect further includes a first detector that detects movement of at least one of the input unit, the transmission mechanism, the front wheel, and the rear wheel. The electronic controller is configured to change the operation state of the suspension based on a detection result of the first detector. In accordance with the third aspect, the operation state of the suspension can be changed at an early stage in accordance with movement of at least one of the input unit, the transmission mechanism, the front wheel, and the rear wheel detected by the first detector.

In accordance with a fourth aspect of the present invention, the bicycle control device according to the third aspect is configured so that. the first detector includes a rotation sensor that detects rotation of the rotation portion of at least one of the input unit, the transmission mechanism, the front wheel, and the rear wheel includes a rotation portion. In accordance with the fourth aspect, the operation state of the suspension can be changed at an early stage in accordance with rotation of the rotation portion included in at least one of the input unit, the transmission mechanism, the front wheel, and the rear wheel detected by the rotation sensor.

In accordance with a fifth aspect of the present invention, the bicycle control device according to the fourth aspect is configured so that the rotation portion includes a pulley of a rear derailleur, and the rotation sensor includes a pulley rotation sensor that detects rotation of the pulley. In accordance with the fifth aspect, the operation state of the suspension can be changed at an early stage in accordance with rotation of the pulley of the rear derailleur detected by the pulley rotation sensor.

In accordance with a sixth aspect of the present invention, the bicycle control device according to the fifth aspect is configured so that the electronic controller is configured to change the operation state of the suspension in a case in which the pulley changes from a non-rotating state or backward rotating state to a forward rotating state. In accordance with the sixth aspect, the operation state of the suspension can be changed at an early stage as the rider starts to pedal the bicycle.

In accordance with a seventh aspect of the present invention, the bicycle control device according to any one of the fourth to sixth aspects is configured so that the rotation portion includes a crank, and the rotation sensor includes a crank rotation sensor that detects rotation of the crank. In accordance with the seventh aspect, the operation state of the suspension can be changed at an early stage in accordance with rotation of the crank detected by the crank rotation sensor.

In accordance with an eighth aspect of the present invention, the bicycle control device according to the seventh aspect is configured so that the crank rotation sensor is configured to detect rotation of the crank relative to a frame of the bicycle. In accordance with the eighth aspect, the operation state of the suspension can be changed at an early stage as the crank starts to rotate relative to the frame.

In accordance with a ninth aspect of the present invention, the bicycle control device according to the seventh aspect is configured so that the crank rotation sensor detects rotation of the crank relative to a bottom bracket coupled to a frame of the bicycle. In accordance with the ninth aspect, the operation state of the suspension can be changed at an early stage as the crank starts to rotate relative to the bottom bracket.

In accordance with a tenth aspect of the present invention, the bicycle control device according to any one of the fourth to ninth aspects is configured so that the rotation portion includes a rear sprocket, and the rotation sensor includes a rear sprocket rotation sensor that detects rotation of the rear sprocket. In accordance with the tenth aspect, the operation state of the suspension can be changed at an early stage in accordance with rotation of the rear sprocket detected by the rear sprocket rotation sensor.

In accordance with an eleventh aspect of the present invention, the bicycle control device according to the tenth aspect is configured so that the rear sprocket sensor is configured to detect rotation of the rear sprocket relative to a frame of the bicycle. In accordance with the eleventh aspect, the operation state of the suspension can be changed at an early stage as the rear sprocket starts to rotate relative to the frame.

In accordance with a twelfth aspect of the present invention, the bicycle control device according to any one of the third to eleventh aspects is configured so that the transmission mechanism includes a rear sprocket and a rear hub on which the rear sprocket is mounted. The rear hub includes a hub shell connected by a spoke to a rim of the rear wheel, a support body that supports the rear sprocket, and a one-way clutch located between the hub shell and the support body. The one-way clutch includes a ratchet provided on one of the hub shell and the support body and a pawl body that is engageable with the ratchet and provided on the other one of the hub shell and the support body. The first detector includes a pressure sensor that detects pressure applied to one of the ratchet and the pawl body.

In accordance with the twelfth aspect, the pressure at one of the ratchet and the pawl body differs between a case in which the ratchet and the pawl body are engaged and the rear wheel is being rotated by the driving force that is input to the input unit and a case in which the ratchet and the pawl body are disengaged and the rear wheel is not being rotated by the driving force that is input to the input unit. Thus, the operation state of the suspension can be changed at an early stage in accordance with the pressure at one of the ratchet and the pawl body detected by the pressure sensor.

In accordance with a thirteenth aspect of the present invention, the bicycle control device according to any one of the third to eleventh aspects is configured so that the transmission mechanism includes a rear sprocket and a rear hub on which the rear sprocket is mounted. The rear hub includes a hub shell connected by a spoke to a rim of the rear wheel, a support body that supports the rear sprocket, and a one-way clutch located between the hub shell and the support body. The one-way clutch includes a first ratchet member engaged with the hub shell and including a first surface provided with first ratchet teeth and a second ratchet member engaged with the support body and including a second surface provided with second ratchet teeth that engage the first ratchet teeth to transmit the driving force to the first ratchet member. The second ratchet member is movable relative to the first ratchet member. The first detector includes a disc ratchet movement sensor that detects relative movement of the first ratchet member and the second ratchet member. In accordance with the thirteenth aspect, the relative positions of first ratchet member and the second ratchet member differs between a case in which the first ratchet member and the second ratchet member are engaged and the rear wheel is being rotated by the driving force that is input to the input unit and a case in which the ratchet and the pawl body are disengaged and the rear wheel is not being rotated by the driving force that is input to the input unit. Thus, the operation state of the suspension can be changed at an early stage in accordance with the relative movement of the first ratchet member and the second ratchet member detected by the disc ratchet movement sensor.

In accordance with a fourteenth aspect of the present invention, the bicycle control device according to the thirteenth aspect is configured so that one of the first ratchet member and the second ratchet member moves in a direction parallel to a rotational axis of the rear hub. Further, the disc ratchet movement sensor is configured to detect movement of one of the first ratchet member and the second ratchet member in a direction parallel to the rotational axis of the rear hub. In accordance with the fourteenth aspect, the operation state of the suspension can be changed at an early stage in accordance with movement of one of the first ratchet member and the second ratchet member in a direction parallel to the rotational axis of the rear hub detected by the disc ratchet movement sensor.

In accordance with a fifteenth aspect of the present invention, the bicycle control device according to any one of the third to fourteenth aspects is configured so that the transmission mechanism includes a chain, and the first detector includes a chain movement sensor that detects movement of the chain and is attached to a chain device that restricts movement of the chain in a direction in which the chain separates from the sprocket. In accordance with the fifteenth aspect, the operation state of the suspension can be changed at an early stage in accordance with movement of the chain detected by movement of the chain movement sensor.

In accordance with a sixteenth aspect of the present invention, the bicycle control device according to any one of the third to fifteenth aspects is configured so that the input unit includes a pedal, and the first detector includes a pedal movement sensor that detects movement of the pedal about a crankshaft. In accordance with the sixteenth aspect, the operation state of the suspension can be changed at an early stage in accordance with movement of the pedal about the crankshaft detected by the pedal movement sensor.

In accordance with a seventeenth aspect of the present invention, the bicycle control device according to any one of the third to sixteenth aspects is configured so that the first detector includes a tire pressure sensor that detects pressure applied to a tire of at least one of the front wheel and the rear wheel. In accordance with the seventeenth aspect, the operation state of the suspension can be changed at an early stage in accordance with the pressure applied to the tire and detected by the tire pressure sensor.

In accordance with an eighteenth aspect of the present invention, the bicycle control device according to any one of the first to seventeenth aspects is configured so that the electronic controller is configured to change the operation state of the suspension if at least one of the input unit, the transmission mechanism, the front wheel and the rear wheel is moved while the rear wheel in a state in which the rear wheel is not rotated by the driving force that is input to the input unit and the driving force is greater than or equal to a predetermined driving force. In accordance with the eighteenth aspect, the operation state of the suspension can be changed at an early stage in accordance with the driving force that reflects the riding intention of the movement to ride the bicycle.

In accordance with a nineteenth aspect of the present invention, the bicycle control device according to the eighteenth aspect further includes a driving force sensor that detects the driving force that is input to the input unit. In accordance with the nineteenth aspect, the driving force sensor detects the driving force in a preferred manner.

A bicycle control device according to a twentieth aspect of the present invention includes an electronic controller that changes an operation state of a suspension of a bicycle in accordance with information reflecting a state of a road surface on which the bicycle travels. The information reflecting the road surface state includes at least one of impact applied to a handlebar of the bicycle, irregularity in changes in depression force applied to a pedal of the bicycle, irregularity in changes in driving force applied to a crank of the bicycle, irregularity in vehicle speed of the bicycle, irregularity in angular speed of at least one wheel of the bicycle, irregularity in angular speed of the crank of the bicycle, and pressure applied to the at least one wheel. In accordance with the twentieth aspect, the operation state of the suspension is changed in a manner suitable for the road surface. This improves usability.

In accordance with a twenty-first aspect of the present invention, the bicycle control device according to the twentieth aspect further includes a second detector that detects the information reflecting the road surface state. The electronic controller is configured to change the operation state of the suspension based on a detection result of the second detector. In accordance with the twenty-first aspect, the second detector detects the information reflecting the road surface state in a preferred manner.

In accordance with a twenty-second aspect of the present invention, the bicycle control device according to any one of the first to twenty-first aspects is configured so that the suspension includes at least one of a front suspension and a rear suspension. In accordance with the twenty-second aspect, the operation state of at least one of the front suspension and the rear suspension is changed in a preferred manner.

A bicycle control device according to a twenty-third aspect of the present invention includes an electronic controller and a memory. The electronic controller is configured to change an operation state of a suspension of a bicycle in accordance with at least one of information reflecting a state of a road surface on which the bicycle travels and information related to a traveling state of the bicycle. The memory stores switching information associating at least one of the information reflecting the road surface state and the information related to the traveling state with the operation state of the suspension. The electronic controller is configured to change the operation state of the suspension in accordance with the switching information and updates the switching information based on an input from an external device. In accordance with the twenty-third aspect, the operation state of the suspension is changed in a preferred manner for one of the road surface state and the traveling state of the bicycle. Further, the switching information is updated to switching information corresponding to preferences and the like of the user. This improves usability.

In accordance with a twenty-fourth aspect of the present invention, the bicycle control device according to the twenty-third aspect is configured so that the information reflecting the road surface state includes at least one of impact applied to a handlebar of the bicycle, impact applied to front fork of the bicycle, impact applied to a frame of the bicycle, irregularity in changes in depression force applied to a pedal of the bicycle, irregularity in changes in driving force applied to a crank of the bicycle, irregularity in vehicle speed of the bicycle, irregularity in angular speed of at least one wheel of the bicycle, irregularity in angular speed of the crank of the bicycle, and pressure applied to tire of at least one wheel. In accordance with the twenty-fourth aspect, the operation state of the suspension is changed in a manner that is suitable for the road surface. This improves the usability.

In accordance with a twenty-fifth aspect of the present invention, the bicycle control device according to the twenty-fourth aspect further includes a second detector that detects the information reflecting the road surface state. The electronic controller is configured to change the operation state of the suspension based on a detection result of the second detector. In accordance with the twenty-fifth aspect, the second detector detects the information reflecting the road surface state in a preferred manner.

In accordance with a twenty-sixth aspect of the present invention, the bicycle control device according to any one of the twenty-third to twenty-fifth aspects is configured so that the suspension includes at least one of a front suspension and a rear suspension, and the switching information includes at least one of the information reflecting the road surface state and the information related to the traveling state and at least one of an operation state of the front suspension and an operation state of the rear suspension. In accordance with the twenty-sixth aspect, the operation state of one of the front suspension and the rear suspension is changed in a preferred manner.

In accordance with a twenty-seventh aspect of the present invention, the bicycle control device according to the twenty-sixth aspect is configured so that the suspension includes both of the front suspension and the rear suspension, and the switching information includes at least one of the information reflecting the road surface state and information related to the traveling state and a combination of the operation state of the front suspension and the operation state of the rear suspension. In accordance with the twenty-seventh aspect, the operation states of both of the front suspension and the rear suspension are changed in a preferred manner.

In accordance with a twenty-eighth aspect of the present invention, the bicycle control device according to any one of the first to twenty-seventh aspects is configured so that the suspension includes a first portion and a second portion fitted to the first portion and movable relative to the first portion, and the operation state of the suspension includes a lock state in which relative movement of the first portion and the second portion is restricted and an unlock state in which relative movement of the first portion and the second portion is permitted. In accordance with the twenty-eighth aspect, the lock state and the unlock state of the suspension are changed in a preferred manner.

In accordance with a twenty-ninth aspect of the present invention, the bicycle control device according to the twenty-eighth aspect is configured so that the unlock state includes a first unlock state and a second unlock state in which the first portion and the second portion relatively move more easily than in the first unlock state. In accordance with the twenty-ninth aspect, the suspension can be changed to a lock state, a first unlock state, and a second unlock state in a further preferred manner. This allows for further fine control.

A bicycle control device according to a thirtieth aspect of the present invention includes an electronic controller that controls a wearable device. The wearable device includes an attachment portion that is attachable to a body or a worn article of a rider of a bicycle and a vibrator that generates vibration and is provided on the attachment portion. The electronic controller is configured to generate vibration with the vibrator in association with at least one of the operation state of a suspension of the bicycle, an operation state of a transmission of the bicycle, an operation state of an assist unit that assist propulsion of the bicycle, and an operation state of an adjustable seatpost of the bicycle. In accordance with the thirtieth aspect, at least one of the operation state of the suspension, the operation state of the transmission, the operation state of the assist unit, and the operation state of the adjustable post can be recognized from the vibration. This improves convenience for the rider. Thus, the usability is improved.

In accordance with a thirty-first aspect of the present invention, the bicycle control device according to the thirtieth aspect is configured so that the electronic controller is configured to generate vibration with the vibrator in a case in which a vibration generator operation unit operable by the rider of the bicycle is operated. In accordance with the thirty-first aspect, the rider is able to recognize at least one of the operation state of the suspension, the operation state of the transmission, the operation state of the assist unit, and the operation state of the adjustable seatpost when wishing to do so.

In accordance with a thirty-second aspect of the present invention, the bicycle control device according to the thirty-first aspect is configured so that the wearable device further includes a vibration generation instruction receiver that receives a vibration generation instruction signal. The bicycle control device further includes a vibration generation instruction transmitter that transmits the vibration generation instruction signal, and the electronic controller is configured to transmit the vibration generation instruction signal to the vibration generation instruction receiver through wireless communication in a case in which the vibration generation operation unit is operated. In accordance with the thirty-second aspect, the wiring of the bicycle control device can be simplified.

A bicycle suspension system according to a thirty-third aspect of the present invention includes the bicycle control device according to any one of the first to thirty-second aspects and the suspension. The suspension includes a generator that generates electric power as the suspension moves and an actuator that changes the operation state using the electric power generated by the generator. In accordance with the thirty-third aspect, the consumed power of the battery can be decreased or the battery can be omitted.

A bicycle suspension system according to a thirty-fourth aspect of the present invention includes the bicycle control device according to any one of the first to thirty-second aspects, a suspension operation unit operable by a rider of the bicycle, a generator that generates power in a case in which the suspension operation unit is operated, and a suspension operation signal transmitter that transmits a suspension operation signal in accordance with an operation of the suspension operation unit using the electric power generated by the generator. The bicycle control device further includes a suspension operation signal receiver that receives the suspension operation signal, and the electronic controller is configured to execute a manual control mode that changes an operation state of the suspension based on the suspension operation signal. In accordance with the thirty-fourth aspect, the consumed power of the battery can be decreased. This improves usability.

A bicycle suspension system according to a thirty-fifth aspect of the present invention includes the bicycle control device according to any one of the first to thirty-second aspects, a suspension operation unit operable by a rider of the bicycle, and a suspension operation signal transmitter that transmits a suspension operation signal in accordance with an operation of the suspension operation unit through wireless communication. The bicycle control device further includes a suspension operation signal receiver that receives the suspension operation signal suspension operation signal transmitter from the suspension operation signal transmitter. The electronic controller is configured to execute a manual control mode that changes an operation state of the suspension based on the suspension operation signal. In accordance with the thirty-fifth aspect, the wiring of the bicycle suspension system can be simplified. This improves usability.

The bicycle control device and the bicycle suspension system including the bicycle control device according to the present invention improve usability.

BRIEF DESCRIPTION OF THE DRAWINGS

Referring now to the attached drawings which form a part of this original disclosure.

DETAILED DESCRIPTION OF EMBODIMENTS

Figure 1:
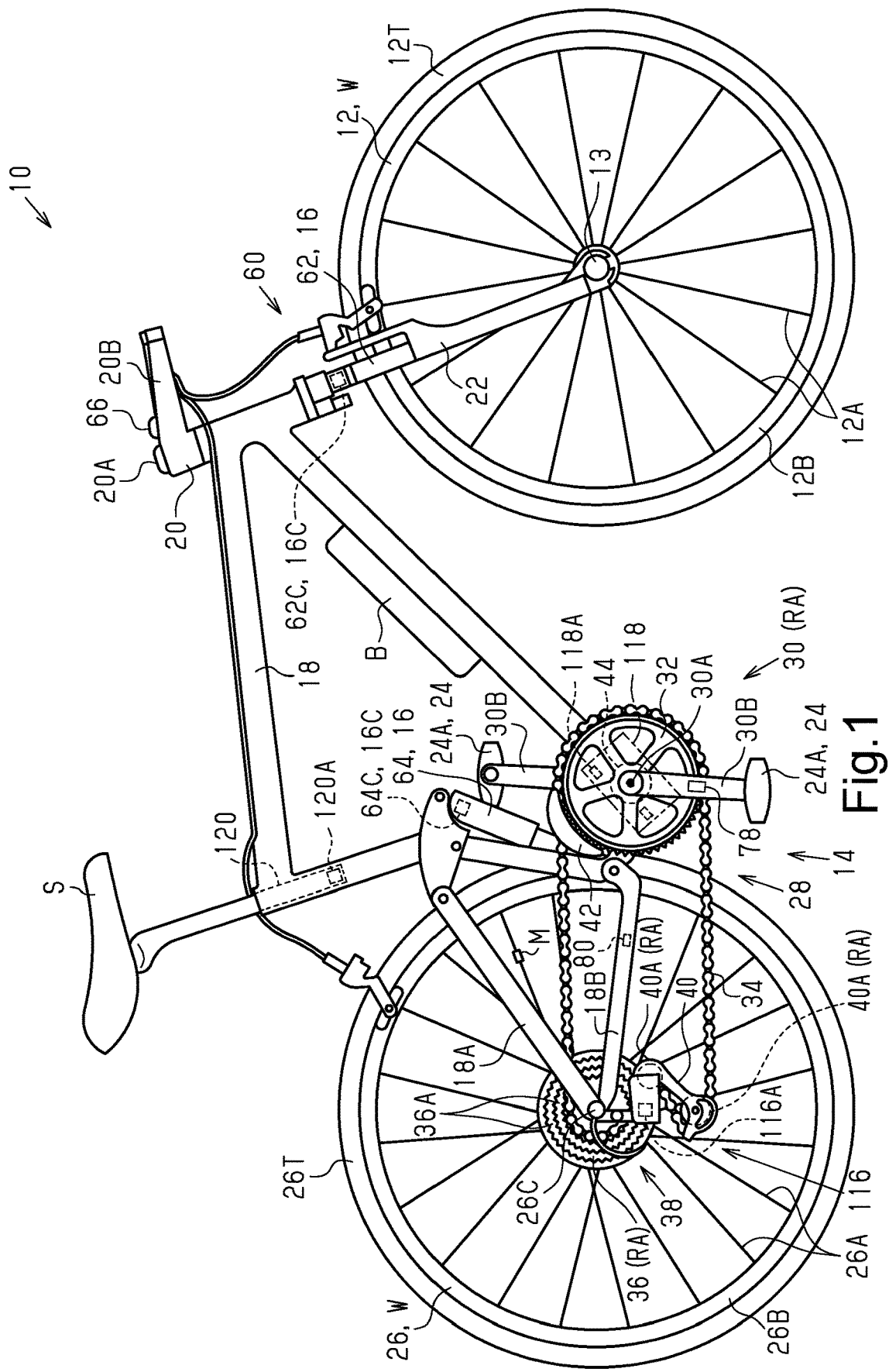
FIG. 1 is a side elevational view of a bicycle including a bicycle suspension system in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 that includes a bicycle suspension system and a bicycle control device will now be described with reference to FIG. 1. The bicycle 10 includes a front wheel 12, a drive train 14 and a pair of suspensions 16. The bicycle 10 further includes a frame 18, a handle unit 20 and a front fork 22. A bicycle suspension system 60 is installed in the bicycle 10. The bicycle suspension system 60 includes the suspensions 16.

The frame 18 includes a swing arm 18A and a chain stay 19B. The handle unit 20 includes a stem 20A and a handlebar 20B. The stem 20A is connected in a removable manner to the front fork 22. The handlebar 20B is configured to be operable by a rider. The front fork 22 is supported by the frame 18. The front wheel 12 includes a plurality of spokes 12A, a rim 12B and a tire 12T. The spokes 12A of the front wheel 12 are connected to a hub shell (not shown) of a front hub 13. The front hub 13 is rotatably supported by a front fastening mechanism (not shown) on an end of the front fork 22.

The drive train 14 includes an input unit 24, a rear wheel 26 and a transmission mechanism 28. Driving force is input to the input unit 24. The input unit 24 includes a pair of pedals 24A. The rear wheel 26 includes a plurality of spokes 26A, a rim 26B and a tire 26T. The spokes 26A of the rear wheel 26 are connected to a hub shell 46 of a rear hub 38 (refer to FIG. 2). The rear hub 38 is rotatably supported by a rear fastening mechanism 26C on a rear end of the swing arm 18A. Rear sprockets 36 are coupled to the rear hub 38. The driving force that is input to the input unit 24 is transmitted to the rear wheel 26.

The transmission mechanism 28 transmits the driving force that is input to the input unit 24 to the rear wheel 26. The transmission mechanism 28 includes a crank 30, a front sprocket 32, a chain 34, the rear sprockets 36, the rear hub 38 and a rear derailleur 40.

The crank 30 includes a crankshaft 30A and a pair of crank arms 30B. The crankshaft 30A is connected to one end of each crank arm 30B. One of the pedals 24A is connected to the other end of each crank arm 30B. The crankshaft 30A is rotatably supported by a bottom bracket 42 coupled to the frame 18.

The driving force that is input to the input unit 24 is transmitted via the crank 30, the front sprocket 32, the chain 34, the rear sprockets 36, the rear derailleur 40, and the rear hub 38 to the rear wheel 26. The front sprocket 32 is coupled to the crankshaft 30A. In addition to the pedals 24A, the input unit 24 can also be considered to include the crank 30 (i.e., the crankshaft 30A and the crank arms 30B).

The chain 34 is wound around the front sprocket 32, one of the rear sprockets 36 and a pair of pulleys 40A of the rear derailleur 40. A chain device 44 is mounted on the frame 18. The chain device 44 restricts movement of the chain 34 in a direction in which the chain 34 separates from the front sprocket 32. In one example, the chain device 44 is coupled to a seat tube of the frame 18 in the vicinity of the front sprocket 32 to cover the outer side of the chain 34 in the widthwise direction of the bicycle 10.

Figure 2:
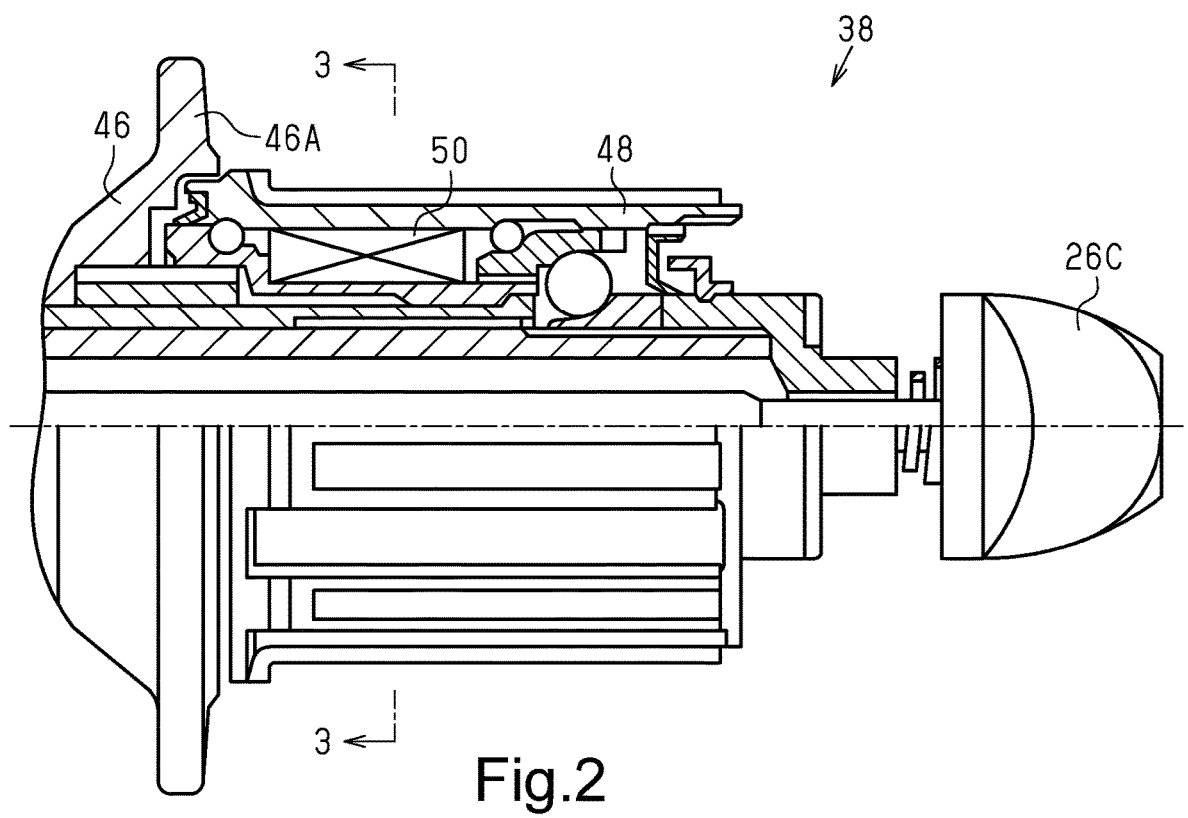
FIG. 2 is a partial cross-sectional view of a rear hub of the bicycle shown in FIG. 1.
Figure 3:
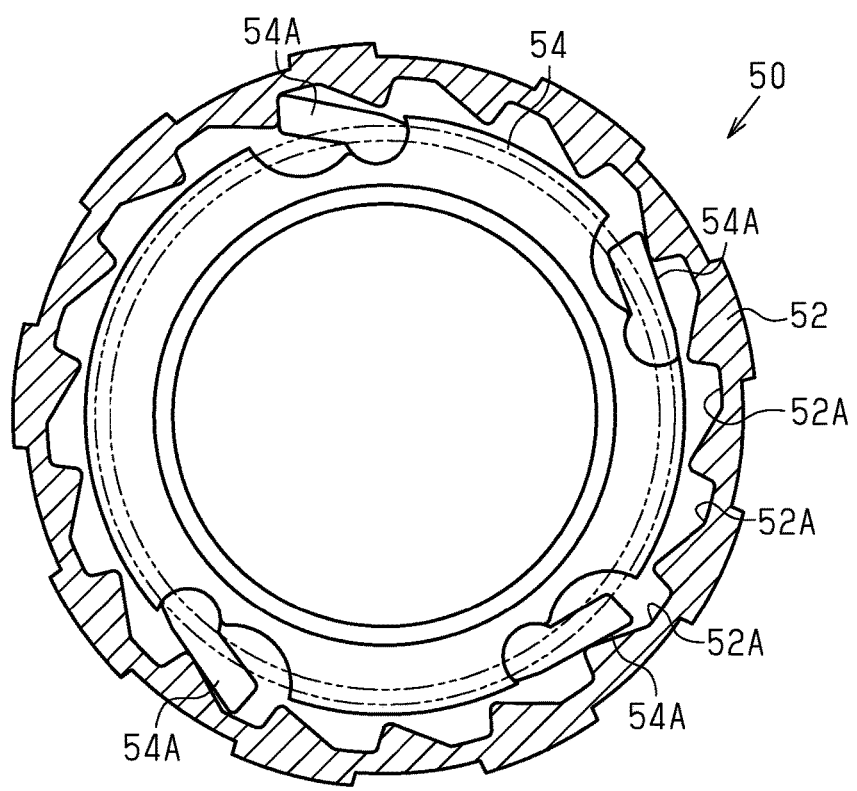
FIG. 3 is a transverse cross-sectional view of the rear hub taken along section line 3-3 in FIG. 2.

As shown in FIGS. 2 and 3, the rear hub 38 includes the hub shell 46, a support body 48 and a one-way clutch 50. The hub shell 46 is connected to the rim 26B of the rear wheel 26 (refer to FIG. 1) by the spokes 26A (refer to FIG. 1). The support body 48 supports the rear sprockets 36 (refer to FIG. 1). The hub shell 46 includes a flange 46A with a portion connected to the spokes 26A.

The one-way clutch 50 is located between the hub shell 46 and the support body 48. The one-way clutch 50 includes a ratchet 52 and a pawl body 54 that is engageable with the ratchet 52. The ratchet 52 is provided on one of the hub shell 46 and the support body 48. The pawl body 54 is provided on the other one of the hub shell 46 and the support body 48. In the rear hub 38 shown in FIGS. 2 and 3, the ratchet 52 is provided on the hub shell 46, and the pawl body 54 is provided on the support body 48. The ratchet 52 is annular and includes an inner circumferential portion provided with a plurality of recesses 52A. The pawl body 54 is located at the radially inner side of the ratchet 52. The pawl body 54 includes an outer circumferential portion provided with a plurality of the pawls 54A. The pawls 54A are pivotally supported by the outer circumferential portion of the pawl body 54. The pawl body 54 rotates integrally with the rear sprockets 36. If the rear sprockets 36 rotate forward, the pawls 54A project toward the recesses 52A and engage the recesses 52A. Thus, the pawl body 54 rotates the ratchet 52 integrally with the rear sprockets 36 by means of the recesses 52A. If backward rotation of the rear wheel 26 rotates the hub shell 46 backward, then the sloped surfaces in the recesses 52A of the ratchet 52 press the pawl body 54 inward in the radial direction. Thus, the ratchet 52 and the pawls 54A are disengaged. This permits relative rotation of the ratchet 52 and the pawl body 54. Forward rotation corresponds to the rotation direction of each rotation body in a case in which the bicycle 10 travels forward. Backward rotation corresponds to the rotation direction of each rotation body in a case in which the bicycle 10 travels backward.

As shown in FIG. 1, the rear sprockets 36 include a plurality of rear sprockets 36A. The rear derailleur 40 moves the chain 34 from one of the rear sprockets 36A to another one of the rear sprockets 36A. Preferably, the rear derailleur 40 includes two of the pulleys 40A.

Figure 6:
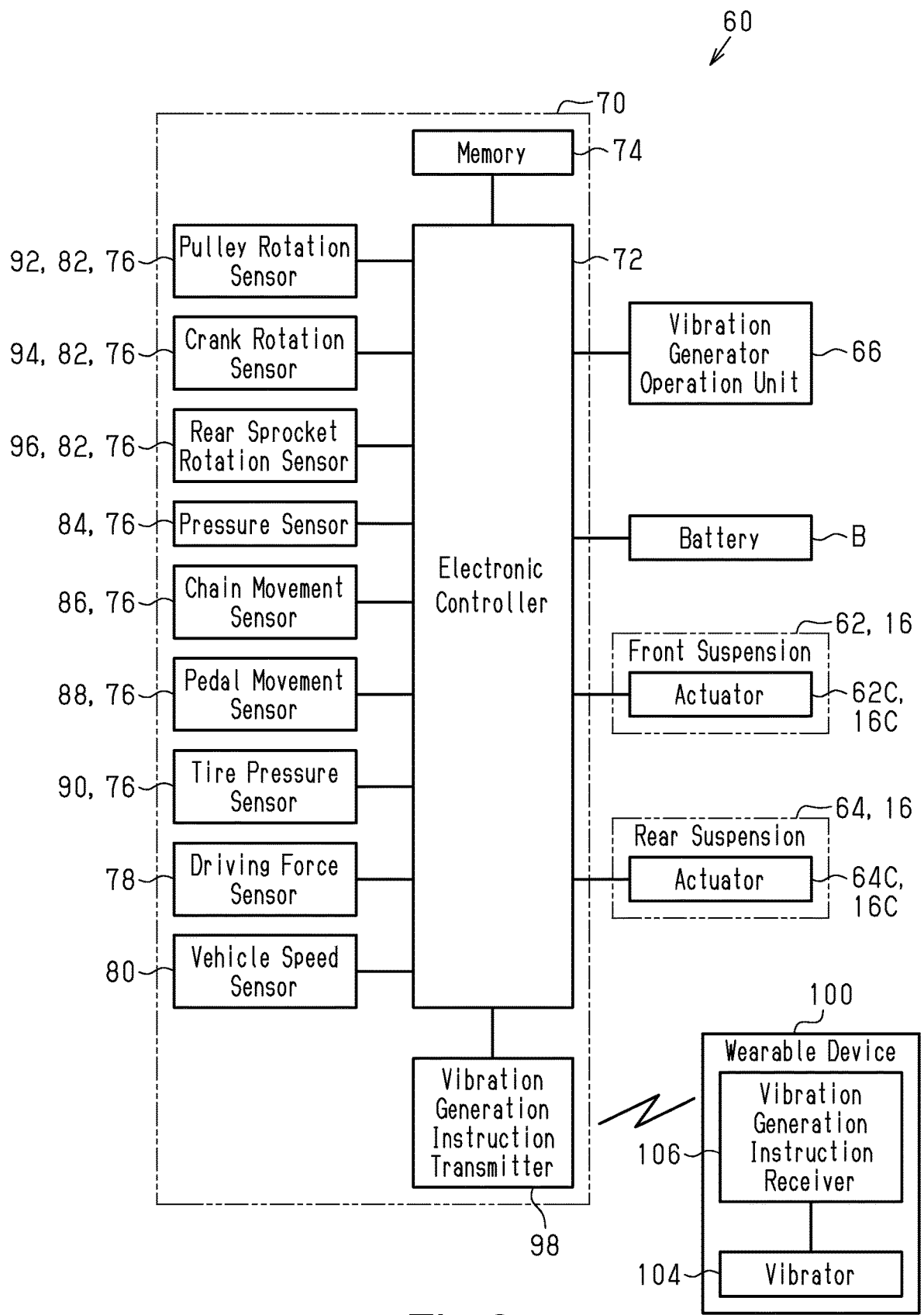
FIG. 6 is a block diagram illustrating the electrical configuration of the bicycle suspension system shown in FIG. 1.

As shown in FIG. 6, the bicycle suspension system 60 includes a bicycle control device 70 and the suspensions 16. Preferably, the bicycle suspension system 60 further includes a battery B that supplies power to components included in the bicycle suspension system 60.

Figure 4:
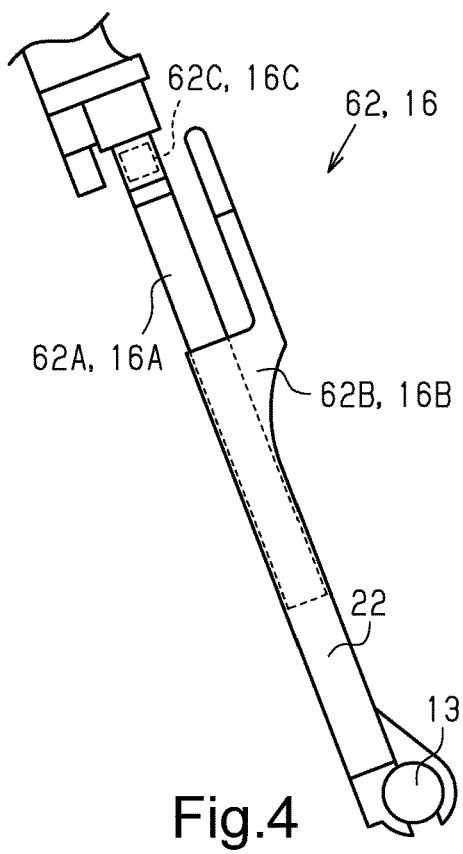
FIG. 4 is a side elevational view of a front suspension of the bicycle shown in FIG. 1.
Figure 5:
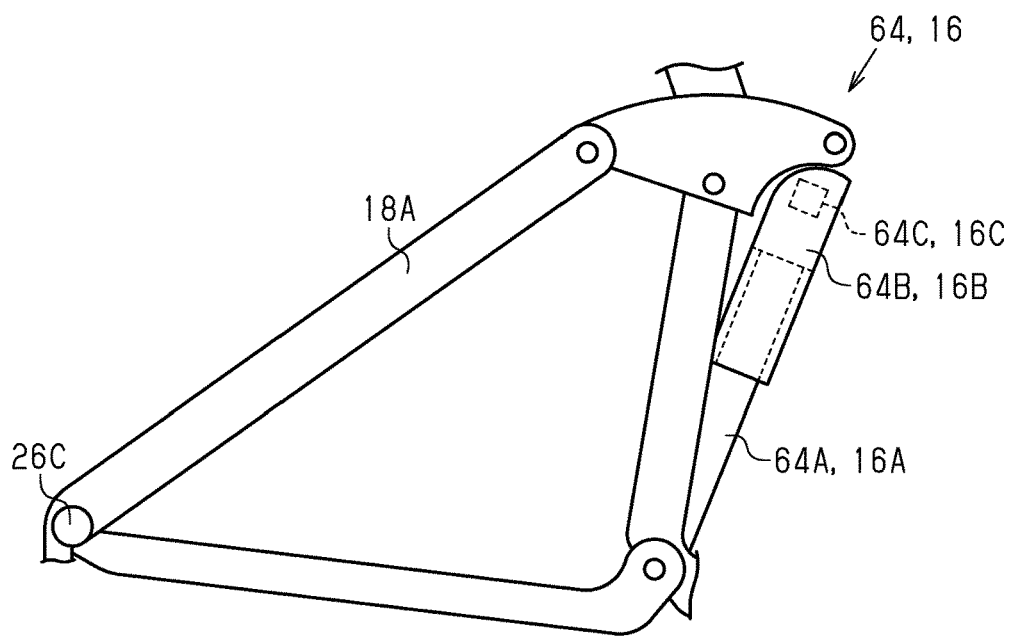
FIG. 5 is a side elevational view of a rear suspension of the bicycle shown in FIG. 1.

As shown in FIGS. 4 and 5, the suspensions 16 each include a first portion 16A and a second portion 16B that is fitted to the first portion 16A and movable relative to the first portion 16A. The suspensions 16 can be a hydraulic suspension or an air suspension. The suspensions 16 absorb impacts applied to the wheels W (refer to FIG. 1). The wheels W include the front wheel 12 and the rear wheel 26. Operation states of the suspensions 16 include a lock state in which relative movement of the first portion 16A and the second portion 16B is restricted and an unlock state in which relative movement of the first portion 16A and the second portion 16B is permitted. The unlock state further includes a first unlock state and a second unlock state in which the first portion 16A and the second portion 16B move relative to each other more easily than the first unlock state. Each suspension 16 further includes an actuator 16C. The actuator 16C includes, for example, an electric motor. The actuator 16C switches the operation states of the suspension 16. The lock state of the suspension 16 can include a state in which the first portion 16A and the second portion 16B move slightly relative to each other if a strong force is applied to the wheels W.

The suspensions 16 include at least one of the front suspension 62 and the rear suspension 64 (refer to FIG. 5). The suspensions 16 of the bicycle 10 shown in FIG. 1 includes both of the front suspension 62 and the rear suspension 64.

The front suspension 62 absorbs impacts applied to the front wheel 12. The front suspension 62 is provided on the front fork 22. As shown in FIG. 4, the front suspension 62 includes a first portion 62A and a second portion 62B that is fitted to the first portion 62A and movable relative to the first portion 62A. Operation states of the front suspension 62 include a lock state in which relative movement of the first portion 62A and the second portion 62B is restricted and an unlock state in which relative movement of the first portion 62A and the second portion 62B is permitted. The unlock state further includes a first unlock state and a second unlock state in which the first portion 62A and the second portion 62B move relative to each other more easily than in the first unlock state. The front suspension 62 further includes the actuator 62C. The actuator 62C includes, for example, an electric motor. The actuator 62C switches the operation states of the front suspension 62. The lock state of the suspension 16 can include a state in which the first portion 16A and the second portion 16B move slightly relative to each other when a strong force is applied to the wheels W. The lock state of the front suspension 62 can include a state in which the first portion 62A and the second portion 62B move slightly relative to each other if a strong force is applied to the front wheel 12.

The rear suspension 64 shown in FIG. 1 absorbs impacts applied to the rear wheel 26. The rear suspension 64 is located between the frame 18 and the swing arm 18A, which supports the rear wheel 26. As shown in FIG. 5, the rear suspension 64 includes a first portion 64A and a second portion 64B that is fitted onto the first portion 64A and movable relative to the first portion 64A. Operation states of the rear suspension 64 include a lock state in which relative movement of the first portion 64A and the second portion 64B is restricted and an unlock state in which relative movement of the first portion 64A and the second portion 64B is permitted. The unlock state further includes a first unlock state and a second unlock state in which the first portion 64A and the second portion 64B move relative to each other more easily than the first unlock state. The rear suspension 64 further includes the actuator 64C. The actuator 64C includes, for example, an electric motor. The actuator 64C switches the operation states of the rear suspension 64. The lock state of the rear suspension 64 can include a state in which the first portion 64A and the second portion 64B move slightly relative to each other if a strong force is applied to the rear wheel 26

The configuration of the bicycle control device 70 will now be described with reference to FIGS. 1 and 6. The bicycle control device 70 includes an electronic controller 72. The bicycle control device 70 further includes a memory 74, a plurality of first detectors 76, a driving force sensor 78, and a vehicle speed sensor 80.

The first detectors 76 are configured to detect movement of at least one of the input unit 24, the transmission mechanism 28, the front wheel 12 and the rear wheel 26. The first detectors 76 allow for detection of the movement of at least one of the input unit 24, the transmission mechanism 28, the front wheel 12, and the rear wheel 26 while the rear wheel 26 in a state in which the rear wheel 26 is not rotated by the driving force that is input to the input unit 24. The first detectors 76 include at least one of a rotation sensor 82, a pressure sensor 84, a chain movement sensor 86, a pedal movement sensor 88 and a tire pressure sensor 90.

At least one of the input unit 24, the transmission mechanism 28, the front wheel 12 and the rear wheel 26 includes a rotation portion RA. The rotation sensor 82 detects rotation of the rotation portion RA. The rotation sensor 82 includes at least one of a pulley rotation sensor 92, a crank rotation sensor 94 and a rear sprocket rotation sensor 96. In a case in which the rotation sensor 82 includes the pulley rotation sensor 92, the rotation portion RA includes the pulleys 40A of the rear derailleur 40. In a case in which the rotation sensor 82 includes the crank rotation sensor 94, the rotation portion RA includes the crank 30. In a case in which the rotation sensor 82 includes the rear sprocket rotation sensor 96, the rotation portion RA includes the rear sprockets 36. During a period from a point of time at which the rear wheel 26 is not rotating to a point of time at which the driving force that is input to the input unit 24 starts to rotate the rear wheel 26, the rotation portion RA starts to rotate before the rear wheel 26 starts to rotate.

The pulley rotation sensor 92 detects rotation of the pulleys 40A of the rear derailleur 40. The pulley rotation sensor 92 is, for example, provided on the rotation shaft of one of the pulleys 40A to detect the rotational phase of the pulley 40A. The pulley rotation sensor 92 can be a rotary encoder or any sensor that detects the magnetic force of a magnet attached to the pulley 40A. The pulley rotation sensor 92 is configured to communicate with the electronic controller 72 through wired connection or wireless connection. The pulley rotation sensor 92 provides the electronic controller 72 with a signal corresponding to the rotational angle of the pulley 40A. The wireless communication standard used by the bicycle suspension system 60 can be, for example, ANT+® or Bluetooth®.

The crank rotation sensor 94 detects rotation of the crank 30. The crank rotation sensor 94 detects, for example, the rotational angle of the crank 30. In one example, the crank rotation sensor 94 detects rotation of the crank 30 relative to the frame 18. In a further example, the crank rotation sensor 94 detects rotation of the crank 30 relative to the bottom bracket 42. The crank rotation sensor 94 is attached to the frame 18 of the bicycle 10. The crank rotation sensor 94 includes a magnetic sensor that outputs a signal corresponding to a magnetic field strength. An annular magnet, of which the magnetic field strength varies in the circumferential direction, is provided on the crankshaft 30A or in a driving force transmission route extending from the crankshaft 30A to the front sprocket 32. The use of a magnetic sensor that outputs a signal corresponding to the magnetic field strength allows the rotational speed of the crank 30 and the rotational angle of the crank 30 to be detected with the same sensor. In addition to the rotational angle of the crank 30, the crank rotation sensor 94 can detect the rotational speed of the crank 30. The crank rotation sensor 94 is configured to communicate with the electronic controller 72 through wired connection or wireless connection. The crank rotation sensor 94 provides the electronic controller 72 with a signal corresponding to the rotational angle of the crank 30.

The rear sprocket rotation sensor 96 detects the rotation of the rear sprockets 36. The rear sprocket rotation sensor 96 detects the rotation of the rear sprockets 36 relative to the frame 18. The rear sprocket rotation sensor 96 is provided on, for example, a portion of the frame 18 facing toward the rear sprockets 36 to detect the rotational phase of the rear sprockets 36. The rear sprocket rotation sensor 96 can be a rotary encoder or any sensor that detects the magnetic force of a magnet attached to the rear sprockets 36. The rear sprocket rotation sensor 96 is configured to communicate with the electronic controller 72 through wired connection or wireless connection. The rear sprocket rotation sensor 96 provides the electronic controller 72 with a signal corresponding to the rotational angle of the rear sprockets 36.

The pressure sensor 84 detects the pressure of at least one of the ratchet 52 of the rear hub 38 and the pawl body 54 of the rear hub 38. The pressure sensor 84 is provided in any of the recesses 52A of the ratchet 52 or on any of the pawls 54A of the pawl body 54. The pressure sensor 84 is configured to communicate with the electronic controller 72 through wired connection or wireless connection. The pressure sensor 84 provides the electronic controller 72 with a signal corresponding to the pressure applied to the recess 52A or the pawl body 54. During a period from a point of time at which the rear wheel 26 is not rotating to a point of time at which the driving force that is input to the input unit 24 starts to rotate the rear wheel 26, the ratchet 52 and the pawl body 54 are engaged with each other before the rear wheel 26 starts to rotate.

The chain movement sensor 86 is attached to the chain device 44 to detect movement of the chain 34. The chain movement sensor 86 is provided on, for example, a portion of the chain device 44 faced toward the chain 34 to detect movement of the chain 34. The chain movement sensor 86 can be a rotary encoder or any sensor that detects the magnetic force of a magnet attached to the chain 34. The chain movement sensor 86 is configured to communicate with the electronic controller 72 through wired connection or wireless connection. The chain movement sensor 86 provides the electronic controller 72 with a signal corresponding to the movement amount of the chain 34. The chain 34 does not move in a state in which the rear wheel 26 is not rotating or a state in which the rear wheel 26 is rotating backward. During a period from a point of time at which the rear wheel 26 is not rotating to a point of time at which the driving force that is input to the input unit 24 starts to rotate the rear wheel 26, the chain 34 starts to move before the rear wheel 26 starts to rotate.

The pedal movement sensor 88 detects movement of the pedals 24A about the crankshaft 30A. The pedal movement sensor 88 is provided on, for example, a portion of the frame 18 that can be faced toward the pedals 24A to detect the rotational phase of the pedals 24A. The pedal movement sensor 88 can detect the magnetic force of a magnet attached to any of the pedals 24A. Further, the pedal movement sensor 88 can be provided on, for example, the pedals 24A to detect the magnetic force of a magnet attached to a portion of the frame 18 that can be faced toward the pedals 24A. The pedal movement sensor 88 is configured to communicate with the electronic controller 72 through wired connection or wireless connection. The pedal movement sensor 88 provides the electronic controller 72 with a signal corresponding to the rotational angle of the pedals 24A. During a period from a point of time at which the rear wheel 26 is not rotating to a point of time at which the driving force that is input to the input unit 24 starts to rotate the rear wheel 26, the pedals 24A start to move before the rear wheel 26 starts to rotate.

The tire pressure sensor 90 detects the pressure of at least one of the tire 12T of the front wheel 12 and the tire 26T of the rear wheel 26. The tire pressure sensor 90 is provided on, for example, at least one of an air valve of the tire 12T, which is mounted on the rim 12B of the front wheel 12, and the air valve of the tire 26T, which is mounted on the rim 26B of the rear wheel 26. The tire pressure sensor 90 detects changes in the pressure of the tires 12T and 26T to detect pressure that acts on the tires 12T and 26T. During a period from a point of time at which the rear wheel 26 is not rotating to a point of time at which the driving force that is input to the input unit 24 starts to rotate the rear wheel 26, the pressure applied to the tires 12T and 26T increases before the rear wheel 26 starts to rotate.

The vehicle speed sensor 80 detects the rotational speed of the rear wheel 26. The vehicle speed sensor 80 is electrically connected to the electronic controller 72 by a wire or in a wireless manner. The vehicle speed sensor 80 is attached to the chain stay 19B of the frame 18. The vehicle speed sensor 80 is configured to communicate with the electronic controller 72 through wired connection or wireless connection. The vehicle speed sensor 80 provides the electronic controller 72 with a signal corresponding to a change in the relative position of the vehicle speed sensor 80 and a magnet M attached to the rear wheel 26. The electronic controller 72 calculates the vehicle speed of the bicycle 10 from the rotational speed of the rear wheel 26. Preferably, the vehicle speed sensor 80 is a Hall element or a magnetic reed of a reed switch.

The driving force sensor 78 detects the driving force T input to the input unit 24. The driving force sensor 78 outputs a signal corresponding to the driving force T. The driving force sensor 78 can be provided in the transmission route of the driving force T extending from the crankshaft 30A to the front sprocket 32. The driving force sensor 78 can also be provided on the crankshaft 30A or the front sprocket 32. Alternatively, the driving force sensor 78 can be provided on the crank arms 30B or the pedals 24A. The driving force sensor 78 can be implemented using, for example, a strain sensor, an optical sensor, a pressure sensor, or the like. A strain sensor includes a strain gauge, a magnetostrictive sensor, and a piezoelectric sensor. Any sensor can be used as the driving force sensor 78 as long as it outputs a signal corresponding to the driving force T applied to the crank arms 30B or the pedals 24A. The driving force sensor 78 is configured to communicate with the electronic controller 72 through wired connection or wireless connection. The driving force sensor 78 provides the electronic controller 72 with a signal corresponding to the driving force T.

The electronic controller 72 is a processor (hardware) that executes predetermined control programs. The processor includes, for example, a central processing unit (CPU) or a micro-processing unit (MPU). The electronic controller 72 can include one or more microcomputers. The electronic controller 72 can further include a communicator. The communicator includes a communication circuit that performs, for example, Power Line Communication (PLC). The electronic controller 72 can be separate from each component, provided on one of the components, or provided on a number of the components.

The memory 74 is any computer storage device or any computer readable medium with the sole exception of a transitory, propagating signal. The memory 74 includes a non-volatile memory such as a RAM (Random Access Memory) device, a hard disk, a flash drive, etc. The memory 74 can be separate from each component, provided on one of the components, or provided on a number of the components. The memory 74 stores switching information associating information related to traveling states with the operation states of the suspensions 16. The switching information can be a table or a map. The information related to the traveling state includes, for example, the driving force T. The switching information includes the information related to traveling states and at least one of operation states of the front suspension 62 and operation states of the rear suspension 64. The suspensions 16 include both of the front and rear suspensions. The switching information includes the information of the traveling states and a combination of operation states of the front suspension 62 and operation states of the rear suspension 64. Table 1 shows one example of relationship information associating the driving force T with the operation states of the suspensions 16 stored in the memory 74. A first driving force T1, a second driving force T2, and a third driving force T3 satisfy the relationship of T1>T2>T3. The third driving force T3 is, for example, zero.

TABLE 1

|  | T1 > T | T1 ≥ T > T2 | T2 ≥ T > T3 | T3 ≥ T |
|---|---|---|---|---|
| Front Suspension | Lock State | 1st Unlock State | 2nd Unlock State | 2nd Unlock State |
| Rear Suspension | Lock State | Lock State | 1st Unlock State | 2nd Unlock State |

In a state in which the rear wheel 26 is not rotated by the driving force T that is input to the input unit 24, the electronic controller 72 changes the operation states of the suspensions 16 in accordance with movement of at least one of the input unit 24, the transmission mechanism 28, the front wheel 12, and the rear wheel 26. In a state in which the rear wheel 26 is not rotated by the driving force T that is input to the input unit 24, if a state in which driving force is not input to the input unit 24 changes to a state in which driving force is input to the input unit 24, then the electronic controller 72 changes the operation states of the suspensions 16 in accordance with movement of at least one of the input unit 24, the transmission mechanism 28, the front wheel 12 and the rear wheel 26.

In a state in which the rear wheel 26 is not rotated by the driving force T that is input to the input unit 24, the electronic controller 72 changes the operation states of the suspensions 16 if at least one of the input unit 24, the transmission mechanism 28, the front wheel 12, and the rear wheel 26 moves in a case in which the driving force T is greater than or equal to the predetermined driving force TA. The predetermined driving force TA is set to, for example, the driving force T that reflects the intention of the rider to start riding the bicycle 10. If the electronic controller 72 controls the suspensions 16 in accordance with table 1, then the predetermined driving force TA can be a value that is less than the third driving force T3 and greater than a fourth driving force T4. If the predetermined driving force TA is a value less than the third driving force T3 and greater than the fourth driving force T4, then the operation states of the suspensions 16 can start to change before the driving force T reaches the third driving force T3 as the bicycle 10 starts to travel.

The electronic controller 72 changes the operation states of the suspensions 16 based on the detection result of the first detectors 76. If the first detectors 76 include the rotation sensor 82, then the electronic controller 72 changes the operation states of the suspensions 16 in a case in which the rotation portion RA changes from a non-rotating state or backward rotating state to a forward rotating state. If the first detectors 76 include the pulley rotation sensor 92, then the electronic controller 72 changes the operation states of the suspensions 16 in a case in which the pulleys 40A change from a non-rotating state or backward rotating state to a forward rotating state. If the first detectors 76 include the crank rotation sensor 94, then the electronic controller 72 changes the operation states of the suspensions 16 in a case in which the crank 30 change from a non-rotating state or backward rotating state to a forward rotating state. If the first detectors 76 include the rear sprocket rotation sensor 96, then the electronic controller 72 changes the operation states of the suspensions 16 in a case in which the rear sprockets 36 change from a non-rotating state or backward rotating state to a forward rotating state.

The electronic controller 72 changes the operation states of the suspensions 16 in a case in which the electronic controller 72 determines from the detection state of the first detectors 76 that the bicycle 10 has started to travel. In the example of table 1, the electronic controller 72 changes the operation state of the rear suspension 64 from the second unlock state to the first unlock state in a case in which the electronic controller 72 determines from the detection result of the first detectors 76 that the bicycle 10 has started to travel.

Figure 7:
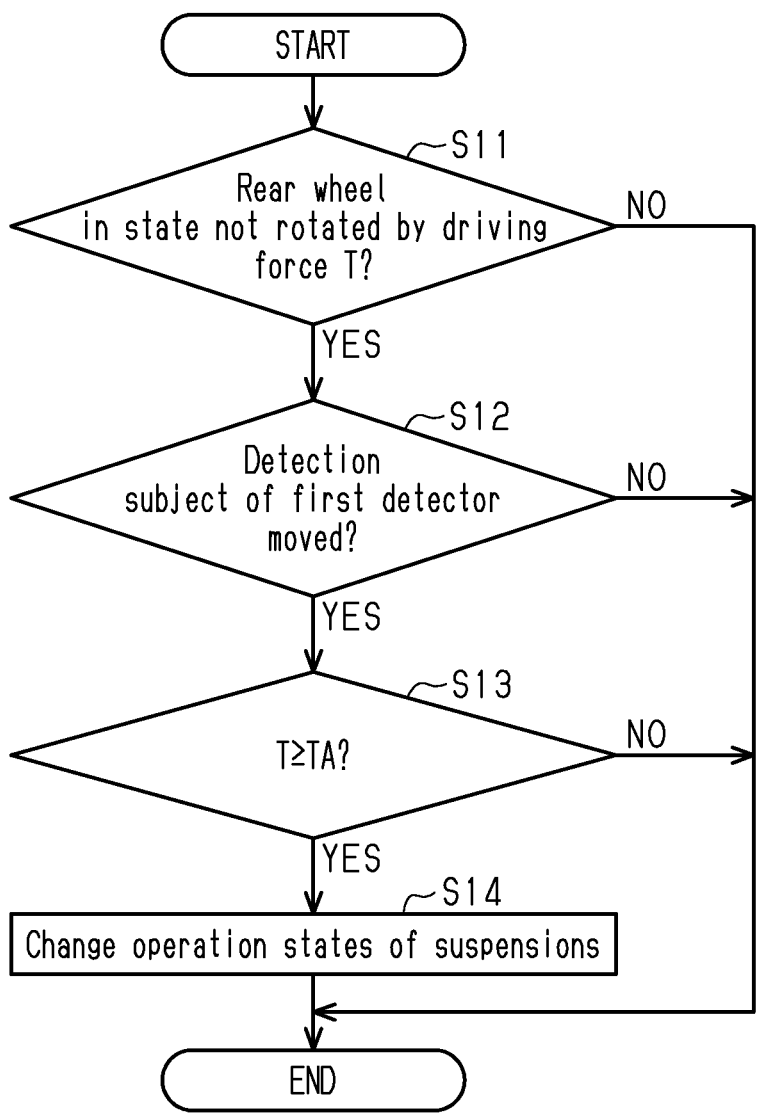
FIG. 7 is a flowchart of a process executed by an electronic controller for changing an operation state of at least one of the front and rear suspensions shown in FIGS. 4 and 5.

With reference to FIG. 7, a control for changing the operation states of the suspensions 16 will now be described. When supplied with power, the electronic controller 72 starts the process and proceeds to step S11 of the flowchart shown in FIG. 7. As long as the electronic controller 72 is supplied with power, the electronic controller 72 executes the process from step S11 in predetermined cycles. In the description hereafter, movement of at least one of the input unit 24, the transmission mechanism 28, the front wheel 12 and the rear wheel 26 detected by the first detectors 76 will be referred to as the movement of the detection subject.

In step S11, the electronic controller 72 determines whether or not the rear wheel 26 is in a state not rotated by the driving force T input to the input unit 24. More specifically, in a case in which the rotational speed of the rear wheel 26 detected by the vehicle speed sensor 80 is zero (or substantially zero), the electronic controller 72 determines that the rear wheel 26 is not being rotated by the driving force T input to the input unit 24. In a case in which the rotational speed of the rear wheel 26 is less than zero, that is, in a case in which the rear wheel 26 is rotating backward, the electronic controller 72 determines that the rear wheel 26 is not being rotated by the driving force T input to the input unit 24. Further, in a case in which the rotational speed of the rear wheel 26 is greater than zero in a state in which at least one of rotation of the crank 30 and movement of the pedals 24A is not detected, that is, in a case in which the bicycle 10 is in a coasting state, the electronic controller 72 determines that the rear wheel 26 is not being rotated by the driving force T input to the input unit 24. In a case in which the electronic controller 72 determines that the rear wheel 26 is being rotated by the driving force T input to the input unit 24, the electronic controller 72 ends the process. In a case in which the electronic controller 72 determines that the rear wheel 26 is in a state not rotated by the driving force T input to the input unit 24, the electronic controller 72 proceeds to step S12.

In step S12, the electronic controller 72 determines whether or not the detection subject of the first detectors 76 has moved. In a case in which the electronic controller 72 determines that the detection subject of the first detectors 76 has not moved, the electronic controller 72 ends the process. If the electronic controller 72 determines that the detection subject of the first detectors 76 has moved, then the electronic controller 72 proceeds to step S13.

In step S13, the electronic controller 72 determines whether or not the driving force T detected after determining that the detection subject of the first detectors 76 has moved is greater than or equal to the predetermined driving force TA. In a case in which the electronic controller 72 determines that the driving force T is less than the predetermined driving force TA, the electronic controller 72 ends the process. If the electronic controller 72 determines that the driving force T is greater than or equal to the predetermined driving force TA, then the electronic controller 72 proceeds to step S14. The electronic controller 72 changes the operation states of the suspensions 16 in step S14 and then ends the process.

The operation of the bicycle control device 70 will now be described. In the example of table 1, the electronic controller 72 sets the operation state of the rear suspension 64 in the second unlock state if the rear wheel 26 is not being driven. Further, the electronic controller 72 sets the operation state of the rear suspension 64 in the first unlock state if movement is detected by the first detectors 76 in a state in which the rear wheel 26 is non-rotating. Thus, before the rear wheel 26 starts to rotate and the bicycle 10 starts to travel, the suspension 16 can be changed to an operation state that is suitable for a case in which the bicycle 10 starts to travel.

The bicycle suspension system 60 shown in FIG. 6 further includes a vibration generator operation unit 66. The vibration generator operation unit 66 is operable by the rider of the bicycle 10. In one example, the vibration generator operation unit 66 is attached to the handle unit 20. The vibration generator operation unit 66 includes, for example, a button, a switch, a lever, a dial and/or a touch screen. The vibration generator operation unit 66 can be considered a user operable input device. The vibration generator operation unit 66 can be directly provided on the handle unit 20 (refer to FIG. 1) or be provided in a cycle computer.

The bicycle control device 70 further includes a vibration generation instruction transmitter 98. The vibration generation instruction transmitter 98 transmits a vibration generation instruction signal. The vibration generation instruction transmitter 98 transmits wireless signals. The electronic controller 72 controls the wearable device 100. The vibration generation instruction transmitter 98 transmits a vibration generation instruction signal to a wearable device 100 to control the wearable device 100.

Figure 8:
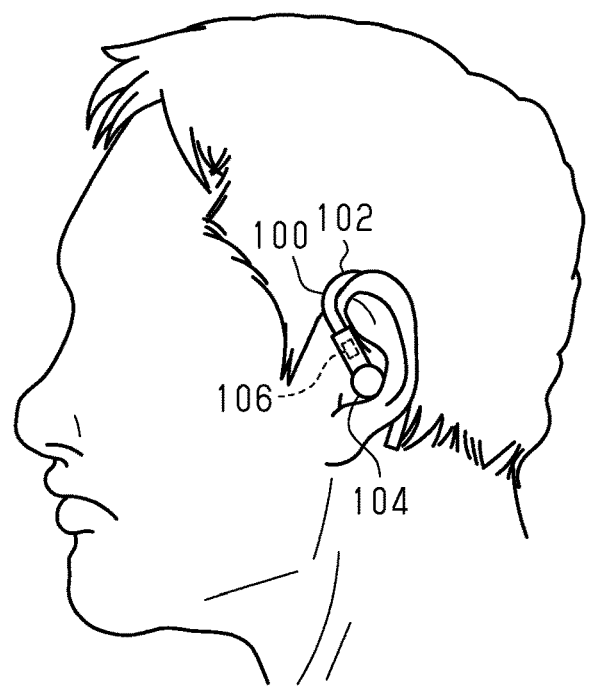
FIG. 8 is a side elevational view of a wearable device that is shown in FIG. 6.

As shown in FIGS. 6 and 8, the wearable device 100 includes an attachment portion 102 and a vibrator 104. The wearable device 100 further includes a vibration generation instruction receiver 106 that receives the vibration generation instruction signal. The vibration generation instruction receiver 106 receives wireless signals.

The attachment portion 102 is attachable to the body or worn article of the rider of the bicycle 10. The attachment portion 102 of the wearable device 100 shown in FIG. 6 includes an ear clip, and is attachable to an ear of the rider. The attachment portion 102 can be a band that is attachable to a wrist of the rider. The attachment portion 102 can be attachable to a worn article of the rider. A worn article includes, for example, clothing, a helmet, and the like. The vibrator 104 is provided in the attachment portion 102 and generates vibration. The vibrator 104 includes, for example, a speaker and generates vibration in an audible frequency range.

The electronic controller 72 generates vibration that is associated with the operation states of the suspensions 16 of the bicycle 10 with the vibrator 104. If the vibration generator operation unit 66 is operated, then the electronic controller 72 generates vibration with the vibrator 104. If the vibration generator operation unit 66 is operated, then the electronic controller 72 transmits a vibration generation instruction signal through wireless communication to the vibration generation instruction receiver 106. Voice is one example of the vibration that is associated with the operation states of the suspensions 16 of the bicycle 10 and generated by the vibrator 104. If the front suspension 62 is in the lock state and the rear suspension 64 is in the first unlock state, then the vibrator 104 outputs voice announcing "front is lock, rear is first unlock." Further, the vibrator 104 generates notification sounds that are associated in advance with the operation states of the suspensions 16. In this case, notifications sound that differ from one another in at least one of number, length, and frequency are associated with the operation states of the suspensions 16.

Figure 9:
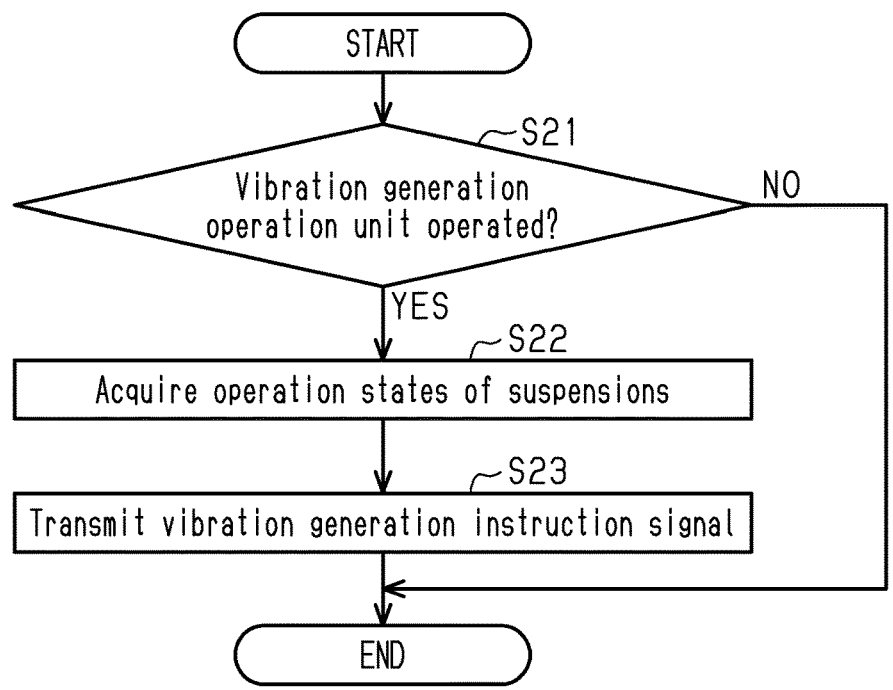
FIG. 9 is a flowchart of a process for controlling the wearable device executed by the electronic controller shown in FIG. 6.

With reference to FIG. 9, a control for notifying the operation states of the suspensions 16 will now be described. When supplied with power, the electronic controller 72 starts the process and proceeds to step S21 of the flowchart shown in FIG. 9. As long as the electronic controller 72 is supplied with power, the electronic controller 72 executes the process from step S21 in predetermined cycles.

In step S21, the electronic controller 72 determines whether or not the vibration generator operation unit 66 has been operated. For example, in a case in which the vibration generator operation unit 66 has been operated and a signal is received from the vibration generator operation unit 66, the electronic controller 72 determines that the vibration generator operation unit 66 has been operated. In a case in which the electronic controller 72 determines that the vibration generator operation unit 66 has not been operated, the electronic controller 72 ends the process. In a case in which the electronic controller 72 determines that the vibration generator operation unit 66 has been operated, the electronic controller 72 proceeds to step S22.

In step S22, the electronic controller 72 acquires the operation states of the suspensions 16 and proceeds to step S23. In step S23, the electronic controller 72 transmits a vibration generation instruction signal associated with the operations states of the suspensions 16 acquired in step S22. Then, the electronic controller 72 ends the process.

Second Embodiment

Figure 10:
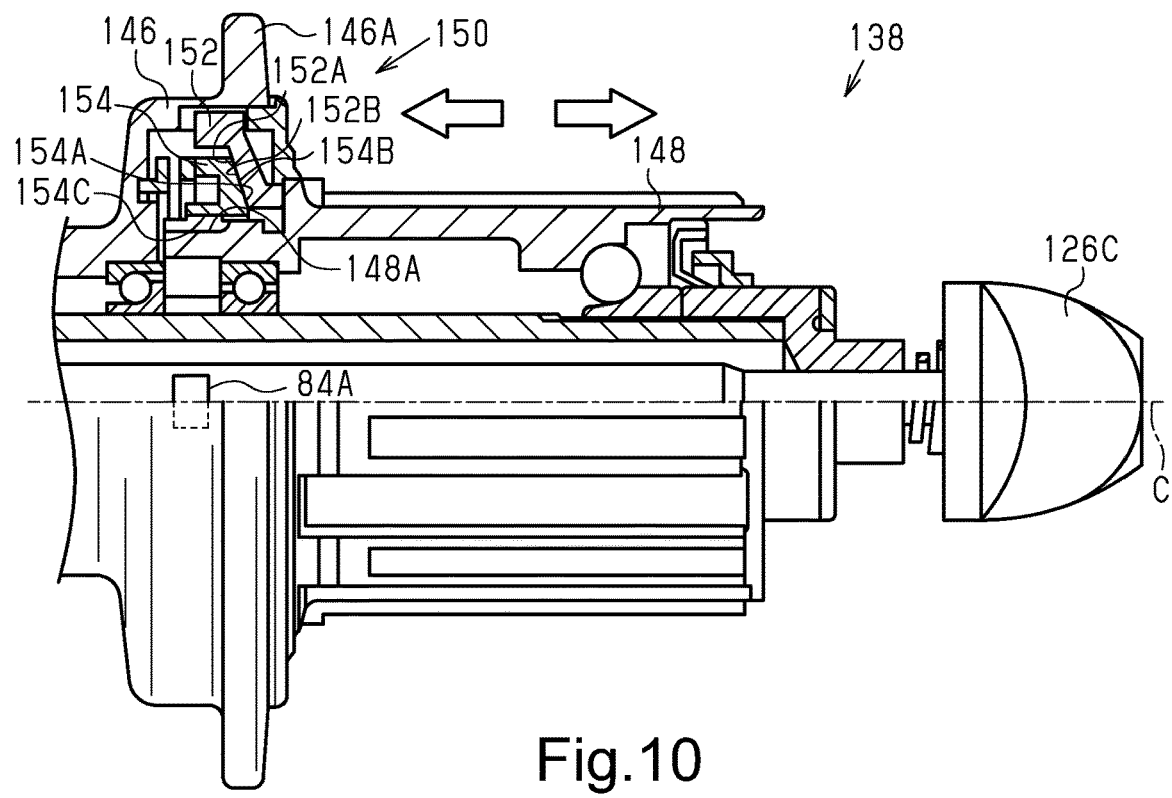
FIG. 10 is a partial cross-sectional view of a rear hub in accordance with a second embodiment.
Figure 11:
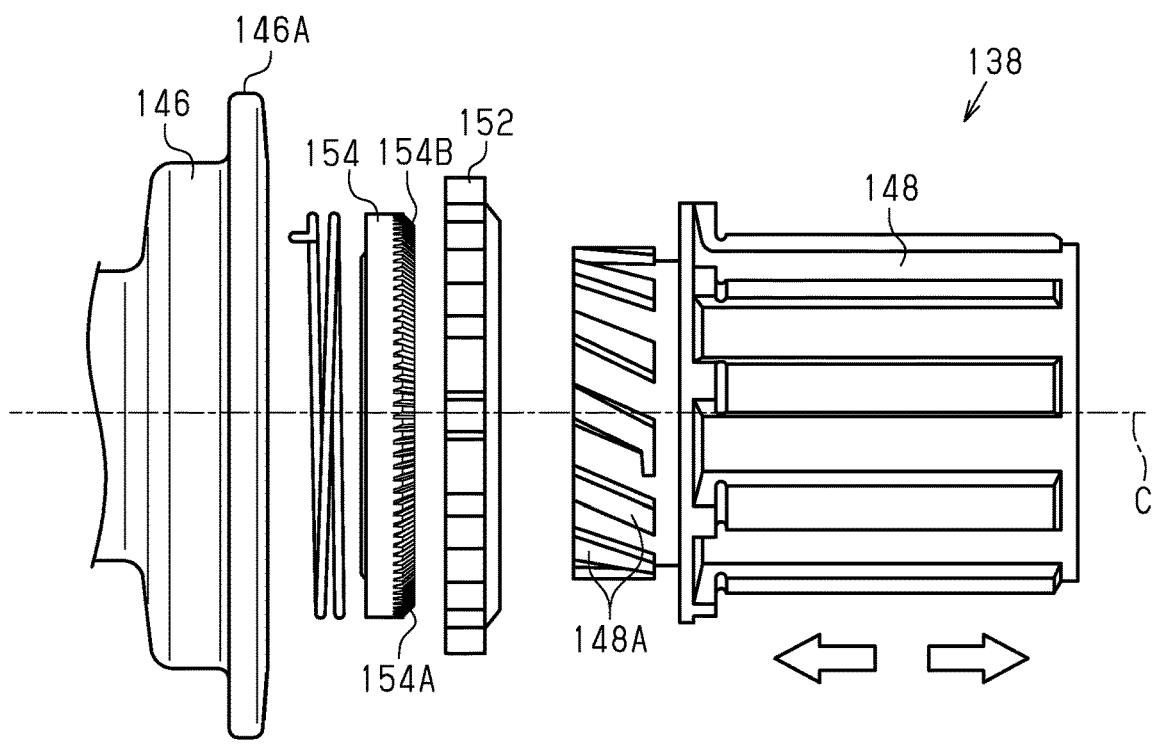
FIG. 11 is a side elevational view of a portion the rear hub of FIG. 10 in a disassembled state.
Figure 12:
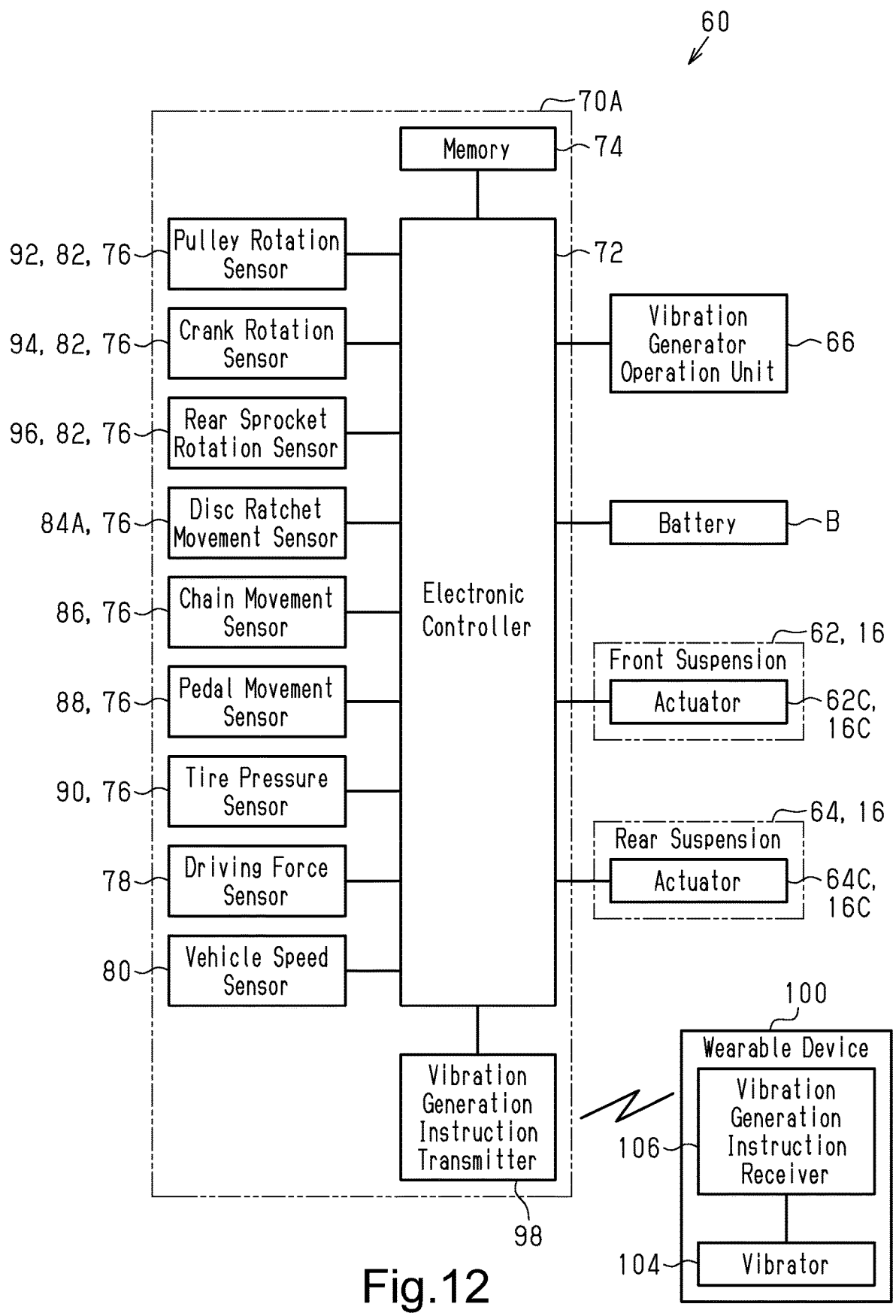
FIG. 12 is a block diagram illustrating the electrical configuration of a bicycle suspension system in accordance with the second embodiment.

With reference to FIGS. 10 to 12, a bicycle control device 70A in accordance with a second embodiment will now be described. The bicycle control device 70A in accordance with the second embodiment differs from the bicycle control device 70 in accordance with the first embodiment in that the bicycle 10 includes a rear hub 138 instead of the rear hub 38 and in that the rear hub 138 is pivotally supported by a rear fastening mechanism 126C on the rear end of the swing arm 18A. Otherwise, the second embodiment is the same as the first embodiment. Thus, same reference numerals are given to those components that are the same as the corresponding components of the first embodiment. Such components will not be described in detail.

As shown in FIGS. 10 and 11, the rear hub 138 includes a hub shell 146, a support body 148 and a one-way clutch 150. The hub shell 146 is connected to the rim 26B of the rear wheel 26 (refer to FIG. 1) by the spokes 26A (refer to FIG. 1). The support body 148 supports the rear sprockets 36 (refer to FIG. 1). The hub shell 146 includes a flange 146A with a portion connected to the spokes 26A.

The one-way clutch 150 is located between the hub shell 146 and the support body 148. The one-way clutch 150 includes a disc-shaped first ratchet member 152 and a disc-shaped second ratchet member 154.

The first ratchet member 152 is engaged with the hub shell 146. The first ratchet member 152 includes a first surface 152A. First ratchet teeth 152B are formed on the first surface 152A. The second ratchet member 154 is engaged with the support body 148. The second ratchet member 154 includes a second surface 154A. Second ratchet teeth 154B are formed on the second surface 154A. The second ratchet teeth 154B engage the first ratchet teeth 152B to transmit the driving force T to the first ratchet member 152. The second ratchet member 154 is movable relative to the first ratchet member 152. One of the first ratchet member 152 and the second ratchet member 154 move in a direction parallel to a rotational axis C of the rear hub 138.

One end of the support body 148, in a direction parallel to the rotational axis C of the rear hub 138, includes first helical splines 148A. An inner circumferential portion of the second ratchet member 154 includes second helical splines 154C that are engaged with the first helical splines 148A. If the driving force T input to the input unit 24 (refer to FIG. 1) rotates the support body 148 forward, the second ratchet member 154 moves in a direction parallel to the rotational axis C along the first helical splines 148A, and the second ratchet teeth 154B engage the first ratchet teeth 152B. This transmits the rotation of the second ratchet member 154 to the first ratchet member 152 and rotates the hub shell 146. If the rear wheel 26 (refer to FIG. 1) rotates backward, the second ratchet member 154 moves in the direction parallel to the rotational axis C along the first helical splines 148A, and the second ratchet teeth 154B are disengaged from the first ratchet teeth 152B. Thus, rotation of the first ratchet member 152 is not transmitted to the second ratchet member 154.

As shown in FIG. 12, the first detectors 76 include a disc ratchet movement sensor 84A. The disc ratchet movement sensor 84A detects relative movement of the first ratchet member 152 and the second ratchet member 154. The disc ratchet movement sensor 84A detects movement of one of the first ratchet member 152 and the second ratchet member 154 in the direction parallel to the rotational axis C of the rear hub 138. The disc ratchet movement sensor 84A is provided on, for example, the rear fastening mechanism 126C of the rear wheel 26. The disc ratchet movement sensor 84A can be a linear encoder or any sensor that detects the magnetic force of a magnet attached to the second ratchet member 154. The disc ratchet movement sensor 84A is configured to communicate with the electronic controller 72 through wired connection or wireless connection. The disc ratchet movement sensor 84A provides the electronic controller 72 with a signal corresponding to the position of the second ratchet member 154.

Third Embodiment

With reference to FIGS. 1 and 13 to 15, a bicycle control device 70B in accordance with a third embodiment will now be described. The bicycle control device 70B in accordance with the third embodiment differs from the bicycle control device 70 in accordance with the first embodiment in that the suspensions 16 are controlled based on detection results of second detectors 108. Otherwise, the third embodiment is the same as the first embodiment. Thus, same reference numerals are given to those components that are the same as the corresponding components of the first embodiment. Such components will not be described in detail.

Figure 13:
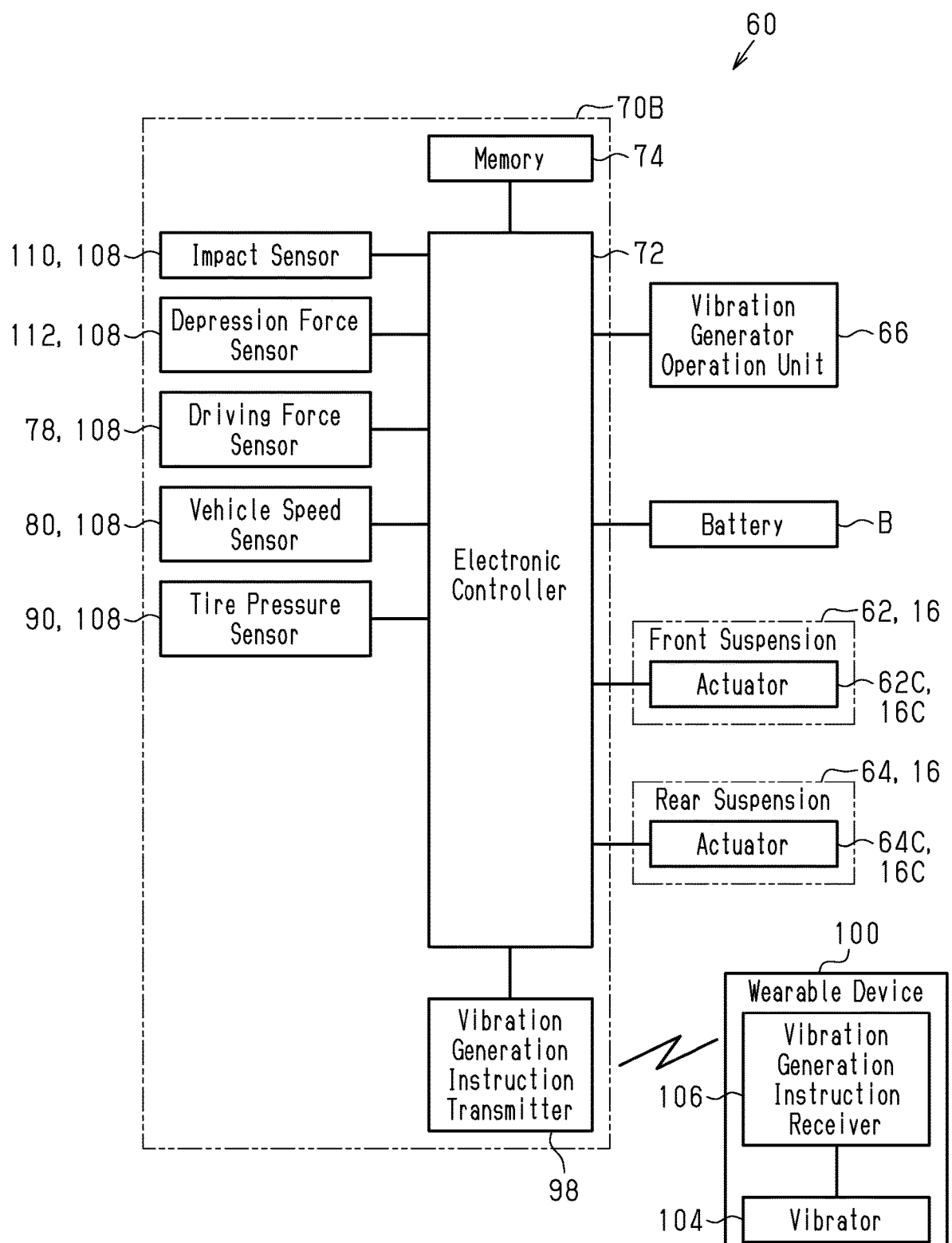
FIG. 13 is a block diagram illustrating the electrical configuration of a bicycle suspension system in accordance with a third embodiment.

The configuration of the bicycle control device 70B will now be described with reference to FIGS. 1 and 13. The bicycle control device 70B includes the electronic controller 72 and the memory 74. The bicycle control device 70A further includes the second detectors 108. The electronic controller 72 changes the operation states of the suspensions 16 in correspondence with information reflecting the state of the road surface on which the bicycle 10 travels. Information reflecting the road surface state includes impact applied to the handle unit 20, irregularity in changes in the depression force applied to the pedals 24A, irregularity in changes in the driving force T applied to the crank 30, irregularity in the vehicle speed, irregularity in the angular velocity of at least one of the wheels W, irregularity in the angular velocity of the crank 30, and pressure applied to at least one of the tires 12T and 26T of the wheels W.

The second detectors 108 detect information reflecting the road surface state. The second detectors 108 detects at least one of the impact applied to the bicycle 10, the depression force applied to the pedals 24A, the driving force T applied to the crank 30, the vehicle speed, the angular velocity of at least one of the wheels W, and the pressure applied to at least one of the tires 12T and 26T of the wheels W. In a case in which the information reflecting the road surface state includes the impact applied to the bicycle 10, the second detectors 108 include an impact sensor 110. In a case in which the information reflecting the road surface state includes the depression force applied to the pedals 24A, the second detectors 108 include a depression force sensor 112. In a case in which the information reflecting the road surface state includes the driving force T applied to the crank 30, the second detectors 108 include the driving force sensor 78. In a case in which the information reflecting the road surface state includes the vehicle speed, the second detectors 108 include the vehicle speed sensor 80. In a case in which the information reflecting the road surface state includes the angular velocity of at least one of the wheels W, the second detectors 108 include the vehicle speed sensor 80. In a case in which the information reflecting the road surface state includes the pressure applied to at least one of the tires 12T and 26T of the wheels W, the second detectors 108 include the tire pressure sensor 90.

The impact sensor 110 is provided on, for example, the handle unit 20. The impact sensor 110 includes, for example, a gyroscope sensor. The impact sensor 110 is configured to communicate with the electronic controller 72 through wired connection or wireless connection. The impact sensor 110 provides the electronic controller 72 with a signal corresponding to the impact applied to the bicycle 10.

The depression force sensor 112 is provided on the pedals 24A. The depression force sensor 112 detects strain of the pedals 24A. The depression force sensor 112 is configured to communicate with the electronic controller 72 through wired connection or wireless connection. The depression force sensor 112 provides the electronic controller 72 with a signal corresponding to the depression force applied to the pedals 24A. The depression force applied to the pedals 24A corresponds to the driving force T applied to the crank 30. Thus, the depression force sensor 112 can be omitted, and the electronic controller 72 can calculate the depression force applied to the pedals 24A based on the detection result of the driving force sensor 78.

The electronic controller 72 changes the operation states of the suspensions 16 based on the detection results of the second detectors 108. The electronic controller 72 changes the operation states of the suspensions 16 in accordance with at least one of the information reflecting the state of road surface on which the bicycle 10 travels and information related to the traveling state of the bicycle 10.

The memory 74 stores switching information that associates one of the information reflecting the road surface state and the information related to the traveling state with the operation states of the suspensions 16. The information related to the traveling state includes, for example, the driving force T. The switching information includes at least one of the information reflecting the road surface state and the information related to the traveling state and at least one of the operation state of the front suspension 62 and the operation state of the rear suspension 64. The suspensions 16 include both of the front and rear suspensions. The switching information includes information related to at least one of the information reflecting the road surface state and the information related to the traveling state and a combination of the operation state of the front suspension 62 and the operation state of the rear suspension 64. The road surface state includes the roughness of the road surface. If the road surface is bumpy, larger impacts applied to the bicycle 10 will indicate that the road surface is rougher.

In a case in which the information reflecting the road surface state includes impacts applied to the handle unit 20, the electronic controller 72 determines that the roughness of the road surface is high if, for example, the velocity or acceleration of the handle unit 20 is greater than or equal to a first predetermined value. Alternatively, the electronic controller 72 determines that the roughness of the road surface is high if the handle unit 20 moves in a number of different directions during a first predetermined period.

Figure 14:
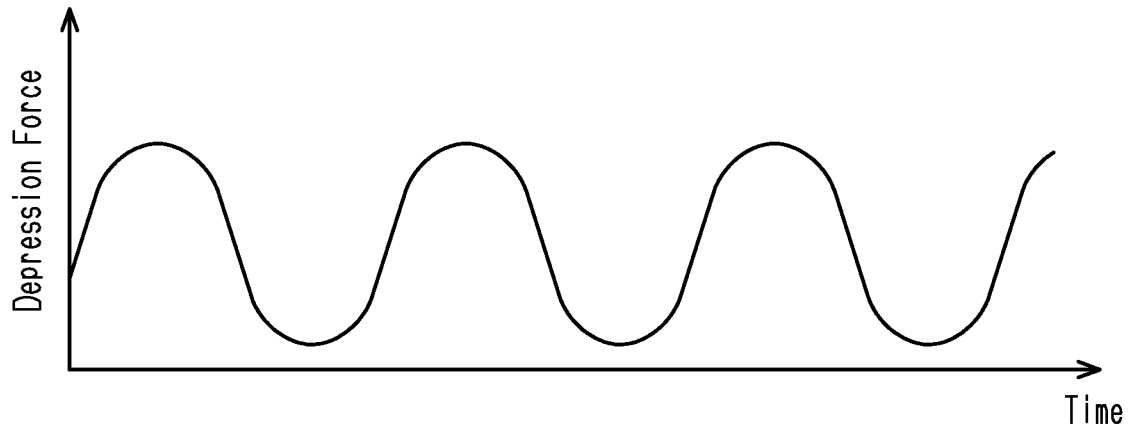
FIG. 14 is a graph showing changes in the depression force over time in a case in which the bicycle is traveling on a smooth road surface.
Figure 15:
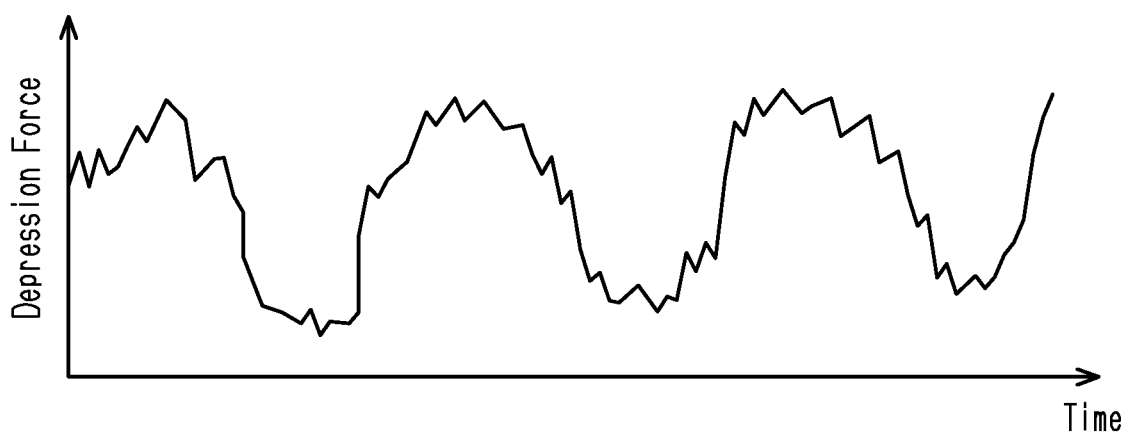
FIG. 15 is a graph showing changes in the depression force over time in a case in which the bicycle is traveling on a rough road surface.

In a case in which the information reflecting the road surface state includes an irregularity in changes in the depression force applied to the pedals 24A, the electronic controller 72 determines that the roughness of the road surface is high if, for example, a change amount of the depression force during a second predetermined period exceeds a second predetermined value. Preferably, the second predetermined period is shorter than a period during which the crank 30 moves from the top dead center or the bottom dead center to a middle angle between the top dead center and the bottom dead center and shorter than a period during which the crank 30 moves from the middle angle between the top dead center and the bottom dead center to the top dead center or the bottom dead center. Preferably, the second predetermined value is smaller than a change amount of the depression force during a period in which the crank 30 moves from the top dead center or the bottom dead center to the middle angle between the top dead center and the bottom dead center. FIG. 14 shows one example of changes in the depression force over time in a case in which the road surface roughness is small, and FIG. 15 shows one example of changes in the depression force over time in a case in which the road surface roughness is large.

In a case in which the information reflecting the road surface state includes an irregularity in changes in the driving force T applied to the crank 30, the electronic controller 72 determines that the road surface is large if, for example, the change amount of the driving force T during the third predetermined period exceeds a third predetermined value. Preferably, the third predetermined period is shorter than a period during which the crank 30 moves from the top dead center or the bottom dead center to the middle angle between the top dead center and the bottom dead center and shorter than a period during which the crank 30 moves from the middle angle between the top dead center and the bottom dead center to the top dead center or the bottom dead center. Preferably, the third predetermined value is smaller than a change amount of the driving force T during a period in which the crank 30 moves from the top dead center or the bottom dead center to the middle angle between the top dead center and the bottom dead center. In a case in which the road surface roughness is small, the driving force T changes over time in the same manner as the depression force shown in FIG. 14. In a case in which the road surface roughness is large, the driving force T changes over time in the same manner as the depression force shown in FIG. 15.

In a case in which the information reflecting the road surface state is the vehicle speed, the electronic controller 72 determines that the road surface roughness is large if, for example, the change amount of the vehicle velocity during a fourth predetermined period exceeds a fourth predetermined value. The electronic controller 72 can determine that the road surface roughness is large in a case in which the acceleration of the vehicle speed during the fourth predetermined period changes from a value greater than zero to a value less than or equal to zero and then changes again to a value greater than zero.

In a case in which the information reflecting the road surface state is the irregularity in the angular velocity of at least one of the wheels W, the electronic controller 72 determines that the road surface roughness is large if, for example, the change amount of the angular velocity of the wheels W during a fifth predetermined period exceeds a fifth predetermined value. The electronic controller 72 can determine that the road surface roughness is large in a case in which the acceleration of the angular velocity of the wheels W during the fifth predetermined period changes from a value greater than zero to a value less than or equal to zero and then changes again to a value greater than zero.

In a case in which the information reflecting the road surface state is the pressure applied to at least one of the tires 12T and 26T of the wheels W, the electronic controller 72 determines that the road surface roughness is large if, for example, the pressure applied to the tires 12T and 26T during a sixth predetermined period exceeds a sixth predetermined value. The electronic controller 72 can determine that the road surface roughness is large in a case in which the pressure applied to the tires 12T and 26T repetitively increases and decreases.

The switching information is set, for example, so that the state of the suspensions 16 is associated with the unlock state if the road surface roughness is relatively large and the state of the suspensions 16 is associated with the lock state if the road surface roughness is relatively small. Table 2 shows one example of the switching information.

TABLE 2

| | Road Surface Roughness | T1 > T | T1 ≥ T > T2 | T2 ≥ T > T3 | T3 ≥ T |
|---|---|---|---|---|---|
| Front Suspension | Small | Lock State | 1st Unlock State | 2nd Unlock State | 2nd Unlock State |
| | Large | 1st Unlock State | 2nd Unlock State | 2nd Unlock State | 2nd Unlock State |
| Rear Suspension | Small | Lock State | Lock State | 1st Unlock State | 2nd Unlock State |
| | Large | Lock State | 1st Unlock State | 2nd Unlock State | 2nd Unlock State |

Fourth Embodiment

Figure 16:
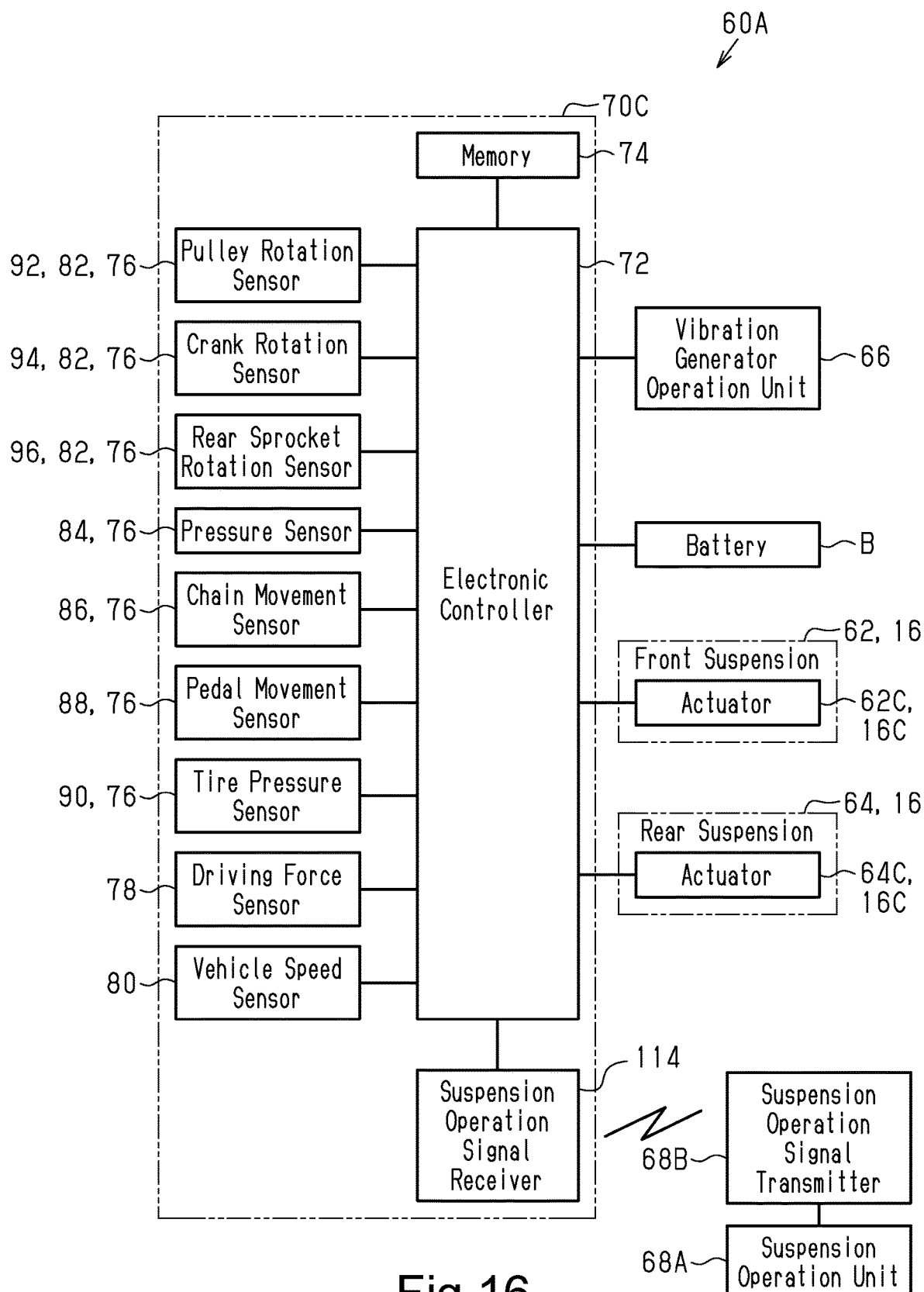
FIG. 16 is a block diagram illustrating the electrical configuration of a bicycle suspension system in accordance with a fourth embodiment.

With reference to FIG. 16, a bicycle control device 70C in accordance with a fourth embodiment will now be described. The bicycle control device 70C in accordance with the fourth embodiment differs from the bicycle control device 70 of the first embodiment in that the electronic controller 72 controls the suspensions 16 based on wireless signals from a suspension operation unit. Otherwise, the fourth embodiment is the same as the first embodiment. Thus, same reference numerals are given to those components that are the same as the corresponding components of the first embodiment. Such components will not be described in detail.

A bicycle suspension system 60A includes the bicycle control device 70C and the suspensions 16. The bicycle suspension system 60A further includes a suspension operation unit 68A and a suspension operation signal transmitter 68B.

The suspension operation unit 68A is operable by the rider of the bicycle 10. The suspension operation unit 68A is provided on, for example, the handle unit 20 (refer to FIG. 1). The suspension operation unit 68A can be directly provided on the handle unit 20 and be provided in a cycle computer. The suspension operation unit 68A includes, for example, a button, a switch, a lever, a dial and/or a touch screen. The suspension operation unit 68A can be considered a user operable input device.

The suspension operation signal transmitter 68B transmits a suspension operation signal corresponding to an operation of the suspension operation unit 68A through wireless communication. The suspension operation signal transmitter 68B is electrically connected to the suspension operation unit 68A. The suspension operation signal transmitter 68B can be provided in the same housing as the suspension operation unit 68A. Alternatively, the suspension operation signal transmitter 68B can be provided separately from the suspension operation unit 68A or connected to the suspension operation unit 68A by an electric wire.

The bicycle control device 70C further includes a suspension operation signal receiver 114 that receives the suspension operation signal from the suspension operation signal transmitter 68B. The electronic controller 72 is configured to execute a manual control mode that changes the operation states of the suspensions 16 based on the suspension operation signal. In a case in which the electronic controller 72 receives the suspension operation signal from the suspension operation signal receiver 114, the electronic controller 72 changes the operation states of the suspensions 16. The manual control mode can be configured to be switched on and off. If the manual control mode is off, then the electronic controller 72 executes an automatic control mode that controls the suspensions 16 in correspondence with the sensor outputs. A process executed in the automatic control mode includes, for example, the process of the first embodiment shown in FIG. 7. If the manual control mode is on, then execution of the automatic control mode by the electronic controller 72 can be restricted.

Modified Examples

The description related with each of the above embodiments exemplifies applicable forms of a bicycle control device and a bicycle suspension system including the bicycle control device according to the present invention and is not intended to limit the forms. In addition to the embodiments described above, the bicycle control device and the bicycle suspension system including the bicycle control device according to the present invention is applicable to, for example, modified examples of the above embodiments that are described below and combinations of at least two of the modified examples that do not contradict each other.

The configuration of at least one of the third embodiment and the fourth embodiment can be combined with the first or second embodiment. In the process of FIG. 7, the determination of step S13 can be omitted. In this case, the electronic controller 72 changes the operation states of the suspensions 16, if the detection subject of the first detectors 76 moves regardless of the level of the driving force T.

The configuration of the fourth embodiment can be combined with the third embodiment. In the third embodiment, the switching information can be set so that it cannot be updated by an input from an external device. In a bicycle control device including the configuration of the third embodiment and the configuration of the fourth embodiment, the electronic controller 72 can update the switching information through a learning process. For example, if the rider switches the operation states of the suspensions 16 in the manual control mode, then the electronic controller 72 stores, in the memory 74, the driving force T or the road surface state in association with the operation states of the suspensions 16. Under a situation matching the driving force T or the road surface state stored in the memory 74, the electronic controller 72 controls the suspensions 16 so that the operation states of the suspensions 16 are switched in correspondence with the driving force T or the road surface state.

In the third embodiment, the traveling state of the bicycle 10 can be omitted from the switching information. For example, as shown in table 3, the switching information associates the information reflecting the road surface state with the operation states of the suspensions 16.

TABLE 3

| | Surface Roughness | |
|---|---|---|
| Front Suspension | Small | Lock State |
| | ↑ | 1st Unlock State |
| | ↓ | 2nd Unlock State |
| | Large | 2nd Unlock State |
| Rear Suspension | Small | Lock State |
| | ↑ | Lock State |
| | ↓ | 1st Unlock State |
| | Large | 2nd Unlock State |

In the third embodiment, the electronic controller 72 can change the operation states of the suspensions 16 in correspondence with the switching information and update the switching information based on inputs from an external device. Inputs from an external device include, for example, inputs from a personal computer, a smartphone, or the like. In this case, the information reflecting the road surface state can include at least one of the impact applied to the front fork 22 of the bicycle 10 and the impact applied to the frame 18 of the bicycle 10. The impact applied to the front fork 22 of the bicycle 10 can be detected by an impact sensor provided on the front fork 22. The impact applied to the frame 18 of the bicycle 10 can be detected by an impact sensor provided on the frame 18.

In the third embodiment, the information reflecting the road surface state can include at least one of whether or not a braking device has performed braking, a change in the height of a seatpost S, the lengths of the strokes of the suspensions 16, and deformation of the frame 18. In a case in which the information reflecting the road surface state includes a change in the height of the seatpost S, it is preferred that the bicycle 10 include an adjustable seatpost 120 that can change the height of the seatpost S shown in FIG. 1. Deformation of the frame 18 includes, for example, deformation resulting from movement about a pivot axis of the swing arm 18A. In a case in which the information reflecting the road surface state includes deformation of the frame 18, deformation of the frame 18 is detected by a sensor that detects movable about the pivot axis of the swing arm 18A.

In the fourth embodiment, the suspensions 16 can include a generator. For example, suspensions 160 shown in FIG. 7 each include a generator 160D and an actuator 160C. The generator 160D generates electric power as the suspension 160 moves, and the actuator 160C uses the electric power generated by the generator 160D to change the operation state. In this modified example, the electronic controller 72 and the suspension operation signal receiver 114 can be provided in the suspension 160. The suspensions 160 include at least one of a front suspension 162 and a rear suspension 164. The front suspension 162 includes a generator 162D and an actuator 162C. The generator 162D generates power as the front suspension 162 moves, and the actuator 162C uses the power generated by the generator 162D to change the operation state. The rear suspension 164 includes a generator 164D and an actuator 164C. The generator 162D generates power as the rear suspension 164 moves, and the actuator 164C uses the power generated by the generator 164D to change the operation state. In a case in which the suspensions 160 include both of the front suspension 162 and the rear suspensions 164, either one of the generator 162D of the front suspension 162 and the generator 164D of the suspension 164 can be omitted. For example, the generator 164D of the rear suspension 164 can be omitted.

Figure 17:
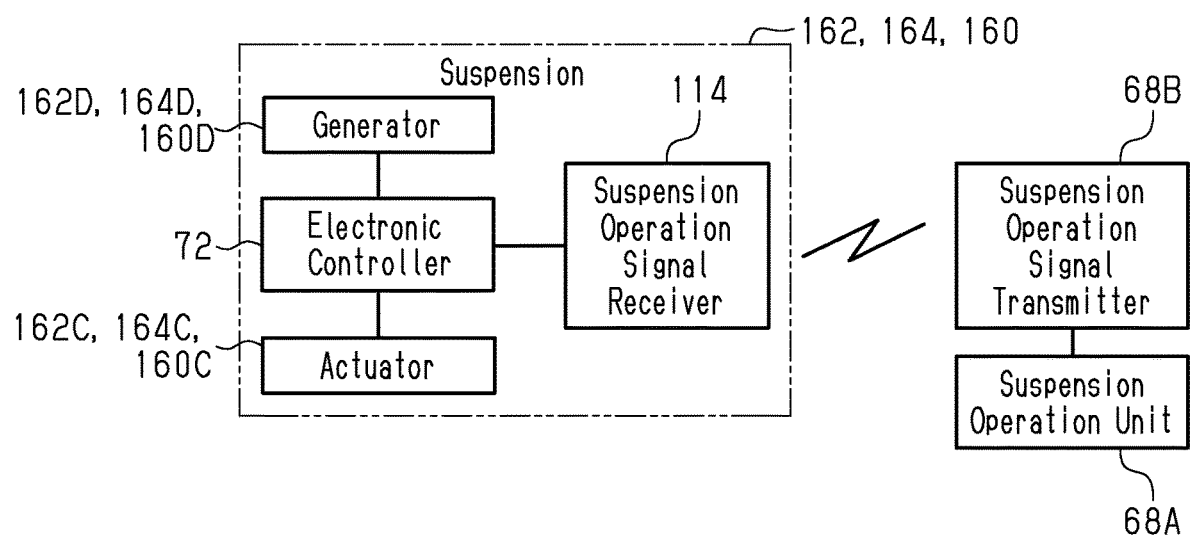
FIG. 17 is a block diagram illustrating the electrical configuration of a bicycle suspension system in accordance with the fourth embodiment.

In the modified example of FIG. 17, a suspension operation unit can be connected by an electric wire to the electronic controller 72. The electronic controller 72 changes the operation states of the suspensions 16 if the suspension operation unit, which is connected by an electric wire, is operated. The suspension operation unit connected by an electric wire may be provided integrally with or separately from the suspension operation unit 68A. In a case in which the suspension operation unit connected by an electric wire is provided integrally with the suspension operation unit 68A, a switch can be provided to switch between a mode for transmitting the suspension operation signal to the electronic controller 72 through the electric wire and a mode for transmitting the signal to the electronic controller 72 through wireless communication.

In each of the above embodiments, the vibrator 104 can be provided on the wearable device 100 in a manner allowing the rider to touch the vibrator 104. In this case, the vibrator 104 vibrates the body or a worn article of the user to notify the rider of the operation states of the suspensions 16. In this case, the rider can be notified of the operation states of the suspensions 16 through bone conduction.

In each of the above embodiments, the electronic controller 72 can vibrate the vibrator 104 whenever changing the operation states of the suspensions 16. In each of the above embodiments, the vibration generator operation unit 66 can be provided on the wearable device 100. In this case, the wearable device 100 is provided with a transmitter that transmits a signal to the electronic controller 72 to request for information related to the operations states of the suspensions 16. In a case in which the electronic controller 72 receives a signal requesting for information related to the operation states of the suspensions 16, the electronic controller 72 transmits a vibration generation signal to the wearable device 100.

In each of the above embodiments, the wearable device 100 and the vibration generation instruction transmitter 98 can be omitted. In each of the above embodiments, the wearable device 100 can be connected by an electric wire to the bicycle control devices 70, 70A, 70B and 70C.

In each of the above embodiments, instead of or in addition to the operation states of the suspensions 16, the electronic controller 72 can generate vibration with the vibrator 104 in accordance with at least one of the operation state of the transmission 116 of the bicycle 10 shown in FIG. 1, the operation state of an assist unit 118 that assists propulsion of the bicycle 10, and the operation state of the adjustable seatpost 120 of the bicycle 10. One example of the transmission 116 is the rear derailleur 40. The transmission 116 includes an electric motor 116A. The operation state of the transmission 116 includes the rotational phase of the electric motor 116A or the position of a link mechanism or plate of the rear derailleur 40. The assist unit 118 includes an electric motor 118A. Alternatively, the assist unit 118 can include a gasoline engine, a diesel engine and/or a hydrogen engine that assists propulsion of the bicycle 10. The operation states of the assist unit 118 include states of different ratios of the output torque of the electric motor 118A to the driving force T. The adjustable seatpost 120 includes an actuator 120A. The operation state of the adjustable seatpost 120 includes the height of the seatpost S.

In each of the above embodiments, the electronic controller 72 can be configured to control only one of the front suspension 62 and the rear suspension 64. In each of the embodiments, one of the front suspension 62 and the rear suspension 64 can be omitted from the bicycle 10. In this case, the electronic controller 72 controls only the other one of the front suspension 62 and the rear suspension 64.

The electronic controller 72 can be configured so as not to operate the components in order depending on the battery level of the battery B. For example, in a case in which the battery level is less than or equal to a first level, the electronic controller 72 is configured not to operate the adjustable seatpost 120. Preferably, the electronic controller 72 stops the adjustable seatpost 120 so that the seatpost S is located at a middle position before being restricted from operating the adjustable seatpost 120. In a case in which the battery level is less than or equal to a second level that is lower than the first level, the electronic controller 72 is configured not to operate the suspensions 16. Preferably, the electronic controller 72 sets the suspensions 16 to the second unlock state before being restricted from operating the suspensions 16. In a case in which the battery level is less than or equal to a third level that is lower than the second level, the electronic controller 72 is configured not to operate the transmission 116. Preferably, the electronic controller 72 stops operating the transmission 116 at a position corresponding to a middle one of the transmission ratios of the bicycle 10 obtained by the transmission 116 before being restricted from operating the transmission 116. In this modified example, the user can change the associated battery level and component of which operation is restricted. The transmission 116 can include an internal geared hub.

What is claimed is:

1. A bicycle control device for a bicycle including a front wheel, a drive train, and a suspension, the drive train including an input unit to which a driving force is input, a rear wheel to which the driving force is transmitted, and a transmission mechanism that transmits the driving force that is input to the input unit to the rear wheel, the bicycle control device comprising:
   an electronic controller configured to
      determine whether the rear wheel is in a state in which the rear wheel is not rotated by the driving force that is input to the input unit, and
      upon determining the rear wheel is in a state in which the rear wheel is not rotated by the driving force that is input to the input unit, change an operation state of the suspension in accordance with movement of at least one of the input unit, the transmission mechanism, the front wheel and the rear wheel.

2. The bicycle control device according to claim 1, wherein
   the electronic controller is configured to change the operation state of the suspension in accordance with the movement of at least one of the input unit, the transmission mechanism, the front wheel and the rear wheel while the rear wheel is not rotated by the driving force that is input to the input unit upon determining a state in which the driving force is not input to the input to the input unit changes to a state in which the driving force is input to the input unit.

3. The bicycle control device according to claim 1, further comprising
a first detector that detects movement of at least one of the input unit, the transmission mechanism, the front wheel and the rear wheel,
the electronic controller is configured to change the operation state of the suspension based on a detection result of the first detector.

4. The bicycle control device according to claim 3, wherein
the first detector includes a rotation sensor that detects rotation of a rotation portion of at least one of the input unit, the transmission mechanism, the front wheel, and the rear wheel.

5. The bicycle control device according to claim 4, wherein
the rotation portion includes a pulley of a rear derailleur, and
the rotation sensor includes a pulley rotation sensor that detects rotation of the pulley.

6. The bicycle control device according to claim 5, wherein
the electronic controller is configured to change the operation state of the suspension in a case in which the pulley changes from a non-rotating state or backward rotating state to a forward rotating state.

7. The bicycle control device according to claim 4, wherein
the rotation portion includes a crank; and
the rotation sensor includes a crank rotation sensor that detects rotation of the crank.

8. The bicycle control device according to claim 7, wherein
the crank rotation sensor is configured to detect rotation of the crank relative to a frame of the bicycle.

9. The bicycle control device according to claim 7, wherein
the crank rotation sensor detects rotation of the crank relative to a bottom bracket coupled to a frame of the bicycle.

10. The bicycle control device according to claim 4, wherein
the rotation portion includes a rear sprocket, and
the rotation sensor includes a rear sprocket rotation sensor that detects rotation of the rear sprocket.

11. The bicycle control device according to claim 10, wherein
the rear sprocket sensor is configured to detect rotation of the rear sprocket relative to a frame of the bicycle.

12. The bicycle control device according to claim 3, wherein
the transmission mechanism includes a rear sprocket and a rear hub on which the rear sprocket is mounted, the rear hub includes a hub shell connected by a spoke to a rim of the rear wheel, a support body that supports the rear sprocket, and a one-way clutch located between the hub shell and the support body, the one-way clutch includes a ratchet provided on one of the hub shell and the support body, and a pawl body that is engageable with the ratchet and provided on the other one of the hub shell and the support body;
the first detector includes a pressure sensor that detects pressure applied to one of the ratchet and the pawl body.

13. The bicycle control device according to claim 3, wherein
the transmission mechanism includes a rear sprocket and a rear hub on which the rear sprocket is mounted, the rear hub includes a hub shell connected by a spoke to a rim of the rear wheel, a support body that supports the rear sprocket, and a one-way clutch located between the hub shell and the support body, the one-way clutch includes a disc-shaped first ratchet member engaged with the hub shell and including a first surface provided with first ratchet teeth, and a second ratchet member engaged with the support body and including a second surface provided with second ratchet teeth that engage the first ratchet teeth to transmit the driving force to the first ratchet member, the second ratchet member being movable relative to the first ratchet member; and
the first detector includes a disc ratchet movement sensor that detects relative movement of the first ratchet member and the second ratchet member.

14. The bicycle control device according to claim 13, wherein
one of the first ratchet member and the second ratchet member moves in a direction parallel to a rotational axis of the rear hub, and
the disc ratchet movement sensor is configured to detect movement of one of the first ratchet member and the second ratchet member in a direction parallel to the rotational axis of the rear hub.

15. The bicycle control device according to claim 3, wherein
the transmission mechanism includes a chain, and
the first detector includes a chain movement sensor that detects movement of the chain, and that is attached to a chain device that restricts movement of the chain in a direction in which the chain separates from the sprocket.

16. The bicycle control device according to claim 3, wherein
the input unit includes a pedal, and
the first detector includes a pedal movement sensor that detects movement of the pedal about a crankshaft.

17. The bicycle control device according to claim 3, wherein
the first detector includes a tire pressure sensor that detects pressure applied to a tire of at least one of the front wheel and the rear wheel.

18. The bicycle control device according to claim 1, wherein
the electronic controller is configured to change the operation state of the suspension if at least one of the input unit, the transmission mechanism, the front wheel and the rear wheel is moved while the rear wheel is in a state in which the rear wheel is not rotated by the driving force that is input to the input unit and the driving force is greater than or equal to a predetermined driving force.

19. The bicycle control device according to claim 18, further comprising
a driving force sensor that detects the driving force that is input to the input unit.

20. The bicycle control device according to claim 1, wherein
the suspension includes at least one of a front suspension and a rear suspension.

21. The bicycle control device according to claim 1, wherein
the suspension includes a first portion and a second portion fitted to the first portion and movable relative to the first portion, and
the operation state of the suspension includes a lock state in which relative movement of the first portion and the second portion is restricted and an unlock state in which relative movement of the first portion and the second portion is permitted.

22. The bicycle control device according to claim 21, wherein
the unlock state includes a first unlock state and a second unlock state in which the first portion and the second portion relatively move more easily than in the first unlock state.

23. A bicycle suspension system including the bicycle control device according to claim 1, the bicycle suspension system further comprising:
the suspension including a generator that generates electric power as the suspension moves and an actuator that changes the operation state using the electric power generated by the generator.

24. A bicycle suspension system including the bicycle control device according to claim 1, the bicycle suspension system further comprising:
a suspension operation unit operable by a rider of the bicycle;
a generator that generates power in a case in which the suspension operation unit is operated; and
a suspension operation signal transmitter that transmits a suspension operation signal in accordance with an operation of the suspension operation unit using the electric power generated by the generator, wherein
the bicycle control device further includes a suspension operation signal receiver that receives the suspension operation signal, and
the electronic controller is configured to execute a manual control mode that changes an operation state of the suspension based on the suspension operation signal.

25. A bicycle suspension system including the bicycle control device according to claim 1, the bicycle suspension system further comprising:
a suspension operation unit operable by a rider of the bicycle;
a suspension operation signal transmitter that transmits a suspension operation signal in accordance with an operation of the suspension operation unit through wireless communication, wherein
the bicycle control device further includes a suspension operation signal receiver that receives the suspension operation signal suspension operation signal transmitter from the suspension operation signal transmitter, and
the electronic controller is configured to execute a manual control mode that changes an operation state of the suspension based on the suspension operation signal.

26. A bicycle control device comprising:
an electronic controller that changes an operation state of a suspension of a bicycle in accordance with information reflecting a state of a road surface on which the bicycle travels;
the information reflecting the road surface state including at least one of
impact applied to a handlebar of the bicycle,
a change amount in depression force applied to a pedal of the bicycle,
a change amount in driving force applied to a crank of the bicycle,
a change amount in vehicle speed of the bicycle,
a change amount in angular speed of at least one wheel of the bicycle,
a change amount in angular speed of the crank of the bicycle, and
pressure applied to the at least one wheel,
the change amount being a difference between values detected during travel of the bicycle.

27. The bicycle control device according to claim 26, further comprising
a second detector that detects the information reflecting the road surface state, and
the electronic controller being configured to change the operation state of the suspension based on a detection result of the second detector.

28. A bicycle control device comprising:
an electronic controller that changes an operation state of a suspension of a bicycle in accordance with at least one of information reflecting a state of a road surface on which the bicycle travels and information related to a traveling state of the bicycle; and
a memory that stores switching information associating at least one of the information reflecting the road surface state and the information related to the traveling state with the operation state of the suspension, the operation state of the suspension being a lock state or an unlock state,
the electronic controller being configured to change the operation state of the suspension in accordance with the switching information and updates the switching information based on an input from an external device, the external device including at least one of a personal computer and a smartphone.

29. The bicycle control device according to claim 28, wherein
the information reflecting the road surface state includes at least one of
impact applied to a handlebar of the bicycle,
impact applied to front fork of the bicycle,
impact applied to a frame of the bicycle,
irregularity in changes in depression force applied to a pedal of the bicycle,
irregularity in changes in driving force applied to a crank of the bicycle,
irregularity in vehicle speed of the bicycle,
irregularity in angular speed of at least one wheel of the bicycle,
irregularity in angular speed of the crank of the bicycle, and
pressure applied to tire of at least one wheel.

30. The bicycle control device according to claim 29, further comprising
a second detector that detects the information reflecting the road surface state, and
the electronic controller being configured to change the operation state of the suspension based on a detection result of the second detector.

31. The bicycle control device according to claim 28, wherein
the suspension includes at least one of a front suspension and a rear suspension, and
the switching information includes at least one of the information reflecting the road surface state and the information related to the traveling state and at least one of an operation state of the front suspension and an operation state of the rear suspension.

32. The bicycle control device according to claim 31, wherein
the suspension includes both of the front suspension and the rear suspension, and
the switching information includes at least one of the information reflecting the road surface state and information related to the traveling state and a combination of the operation state of the front suspension and the operation state of the rear suspension.

33. A bicycle control device comprising:
an electronic controller that controls a wearable device,
the wearable device includes an attachment portion that is attachable to a body or a worn article of a rider of a bicycle and a vibrator that generates vibration and is provided on the attachment portion, and
the electronic controller being configured to generate vibration with the vibrator in association with at least one of the operation state of a suspension of the bicycle, an operation state of a transmission of the bicycle, an operation state of an assist unit that assist propulsion of the bicycle, and an operation state of an adjustable seatpost of the bicycle.

34. The bicycle control device according to claim 33, wherein
the electronic controller is configured to generate vibration with the vibrator in a case in which a vibration generator operation unit operable by the rider of the bicycle is operated.

35. The bicycle control device according to claim 34, wherein
the wearable device further includes a vibration generation instruction receiver that receives a vibration generation instruction signal,
the bicycle control device further comprises a vibration generation instruction transmitter that transmits the vibration generation instruction signal, and
the electronic controller is configured to transmit the vibration generation instruction signal to the vibration generation instruction receiver through wireless communication in a case in which the vibration generation operation unit is operated.

* * * * *